(12) United States Patent
El Kolli et al.

(10) Patent No.: US 10,866,624 B2
(45) Date of Patent: Dec. 15, 2020

(54) POWER MANAGEMENT METHOD OF A SYSTEM MADE OF DEVICES POWERED OVER DATA CABLE

(71) Applicant: CANON KABUSHIKI KAISHA, Tokyo (JP)

(72) Inventors: Yacine El Kolli, Rennes (FR); Pascal Lagrange, La Chapelle des Fougeretz (FR)

(73) Assignee: Canon Kabushiki Kaisha, Tokyo (JP)

( * ) Notice: Subject to any disclaimer, the term of this patent is extended or adjusted under 35 U.S.C. 154(b) by 145 days.

(21) Appl. No.: 16/090,359

(22) PCT Filed: Mar. 30, 2017

(86) PCT No.: PCT/EP2017/057617
§ 371 (c)(1),
(2) Date: Oct. 1, 2018

(87) PCT Pub. No.: WO2017/167926
PCT Pub. Date: Oct. 5, 2017

(65) Prior Publication Data
US 2019/0113960 A1   Apr. 18, 2019

(30) Foreign Application Priority Data

Apr. 1, 2016   (GB) .................................. 1605593.1

(51) Int. Cl.
*G06F 1/00* (2006.01)
*G06F 1/3203* (2019.01)
*H04N 5/247* (2006.01)
*H04L 12/10* (2006.01)
*G06F 1/24* (2006.01)
(Continued)

(52) U.S. Cl.
CPC .............. *G06F 1/3203* (2013.01); *G06F 1/24* (2013.01); *G06F 1/30* (2013.01); *G06F 11/079* (2013.01); *H04L 12/10* (2013.01); *H04N 5/247* (2013.01)

(58) Field of Classification Search
CPC . G06F 1/24; G06F 1/30; G06F 1/3203; G06F 11/079; H04L 12/10; H04N 5/247
See application file for complete search history.

(56) References Cited

U.S. PATENT DOCUMENTS

2006/0082222 A1   4/2006 Pincu et al.
2014/0018970 A1   1/2014 Lehr et al.
(Continued)

*Primary Examiner* — Nitin C Patel
(74) *Attorney, Agent, or Firm* — Canon U.S.A., Inc. IP Division

(57) ABSTRACT

The invention relates to power over data cable (PoC) systems comprising power source equipment, PSE, and plural PoC devices connected to the PSE. The PoC devices can operate in various power modes including low and high power modes. A method of managing power performed by a processing device of the system upon starting-up includes: reading, in memory of the processing device, a power change record to determine if, prior to the start-up, a target PoC device was about to switch from the low power mode to the high power mode; if it was about to switch, restricting it to remain in the low power mode; otherwise, triggering the target device to switch to the high power mode. As being restricted to the low power mode, the target device can no longer cause power failures. Thus endless loops of power failures caused by one and the same device are avoided.

20 Claims, 13 Drawing Sheets

(51) Int. Cl.
   *G06F 11/07*     (2006.01)
   *G06F 1/30*      (2006.01)

(56) References Cited

U.S. PATENT DOCUMENTS

2014/0208140 A1    7/2014   Brooks et al.
2015/0143144 A1*   5/2015   Balbierer .......... H04L 12/40136
                                              713/320

* cited by examiner

POWER MANAGEMENT METHOD OF A SYSTEM MADE OF DEVICES POWERED OVER DATA CABLE

CROSS-REFERENCE TO RELATED APPLICATIONS

This application is the National Phase application of PCT Application No. PCT/EP2017/057617, filed on Mar. 30, 2017, which claims the benefit under 35 U.S.C. § 119(a)-(d) of United Kingdom Patent Application No. 1605593.1, filed on Apr. 1, 2016 and entitled "POWER MANAGEMENT METHOD OF A SYSTEM MADE OF DEVICES POWERED OVER DATA CABLE". The above cited patent application is incorporated herein by reference in its entirety."

FIELD OF THE INVENTION

The present invention relates in general to power over data cable (PoC) systems, and in particular to a method, a device, a system and a computer program configured for power management of power-over-cable systems comprising a power source equipment device, PSE, (also known as "switch" or "receiver" or "extender") acting as a power source and data switch, and comprising devices powered-over-cable by the power source equipment, preventing them from repetition of power failures occurred during the start-up of at least part of the system.

The invention is suitable for various applications, including video surveillance applications.

BACKGROUND OF THE INVENTION

Power distribution over data cables (PoC) is a very interesting topic in several fields such as IT and telecommunication systems related systems comprising the video surveillance systems. Several types of power distribution over data cables exist to be selected to use according to users' needs in terms of power required by devices to be powered, bandwidth limitation(s) and distances between the devices to be powered and the power source equipment.

Power-over-cable systems, be they Ethernet links (PoE) or Coax links, comprise at least one power source equipment device acting as a power source and data switch, and comprising a plurality of PoC devices which are devices (e.g. cameras, printers, telemeters, . . . ) powered via the cables by the power source equipment (which is thus another device separate from the PoC devices). PoC systems advantageously avoid using a parallel power network or battery solutions, thereby saving corresponding additional costs.

However, power distribution over data cables suffers from limitations on the total power that can be carried and on a high power loss in the cable due to a relatively low voltage that is carried (e.g. a low voltage being comprised between 48 to 56 volts). On the contrary, a general power distribution network carries a voltage comprised between 110 and 220 volts and thus suffers less power loss but requires AC/DC converters to power the PoC devices.

In a general case, the power supply in a PoC system is controlled by power source equipment which comprises an AC/DC converter from a general power distribution network. The power source equipment comprises one or more ports via which the PoC devices are connected to it and thus powered, while data can be transmitted over the same cables.

The power supply in a PoC system is constrained at two levels—port level and system level. The power is constrained at the port level because a power source equipment is able to deliver or supply power via a single port up to a fixed maximum amount of power, whatever the number of PoC devices connected to said single port. The power is also constrained at the system level because the sum of per port available powers shall be sustained and limited by the capacity provided by the power source equipment. Typically the power source equipment has an overall power capacity that is inferior to the sum of port power capacities of individual switch ports.

PoC device manufacturers, e.g. video surveillance COAX camera manufacturers, document the maximum and typical power consumption of their devices. This is used by a system integrator for dimensioning the PoC system. Often the maximum power consumption specification for a camera is a conservative figure and is higher than what is actually consumed by the camera.

One can design a PoC system based on the sum of the max power consumptions announced by the PoC device manufacturers and thus can end up with a power unconstrained system.

However, the above-mentioned design is usually not optimum, in particular because a greater number of power source equipment devices or PoC devices is provided in order to avoid constraints. Better system designs are thus sought.

In addition, a PoC system may be well dimensioned in terms of power consumption upon system setup. However, few months or years later, the PoC system may be upgraded with greedier and/or new PoC devices (e.g. PoC cameras) and thus might become "under dimensioned" especially when the time frame between the original system setup and the upgrade is long.

As for PoE systems, it is conventional and general that a PoE system has a power source equipment device or a PoC device (such as a PoE camera) performing its own power budget management so as to deny power to PoC devices in case the power budget is exceeded. This approach is limited to a system configuration with short data cables, up to 100 m, and with a single device powered by each data cable.

Although the above approach might be transferable to point-to-point IP-over-Coax systems, the approach cannot be applied to multi-point IP-over-Coax systems (e.g. with a daisy chaining configuration). So under dimensioned system will face power overrun issues, at port level or system level.

There is thus a need to provide power budget management to more complex system configurations and/or with using longer cables, for instance for video surveillance applications in which cable lengths are considerably greater and are used to power a plurality of PoC devices by the same switch port.

The power source equipment is protected against power overrun. The ports of the power source equipment have software protection that cuts the power supply when a power overrun is detected at port level or system level, and restores the power supply when the power demand is back acceptable.

Moreover, each of the ports of the power source equipment may have a fuse protection in case the software protection fails. And the power source equipment itself is also protected by software and/or hardware such as a fuse.

In IP over Coax systems (and more generally in PoC systems), a power overrun may result in a shutdown such as a PSE port shutdown, a power source equipment shutdown (i.e. a system shutdown) or more seriously, a fuse blow-up either at a port level or at a system level.

In a case where a PSE port is shutdown, all the PoC cameras/devices that are linked to the port are powered off and then powered up again as the port restarts. However, the port will be shut down again if the conditions of power overrun for the port are met again during a reboot of the cameras. An endless loop of shutdowns and reboots may thus occur, until one or more PoC cameras/devices are unplugged from the port.

In a case where the power source equipment itself is shutdown, all the cameras/PoC devices of the PoC system are powered off and then powered up again as the power source equipment restarts. However, similarly to the above endless loop issue at port level, the power source equipment may be shut down again if the conditions of power overrun for the power source equipment are met again upon restarting the system. Again an endless loop of shutdowns and reboots occurs until one or more cameras/devices are unplugged from the power source equipment.

A difference between the shutdown at the PSE port level and at the system level (i.e. the PSE level) is the number of affected PoC cameras/devices.

One of objectives of the invention is therefore to prevent the PoC system from entering an endless loop of shutdowns and reboots in case of a power overrun at the port level or at the system level.

In addition, the invention seeks to provide a feedback to the operator when a failure occurs due to a power overrun. The feedback includes but is not limited to the identification of at least one PoC device that caused a power failure.

SUMMARY OF THE INVENTION

The present invention has been devised to address one or more of the foregoing concerns.

According to first embodiments of the invention, there is provided a method of managing power in a power-over-data cable (PoC) system, the system comprising power source equipment and plural PoC devices connected to the power source equipment, wherein the plural PoC devices are operable in a plurality of power modes comprising a low power mode and a high power mode, the method comprising the following steps performed by a processing device of the system upon starting-up:
  reading, in memory of the processing device, a power change record to determine if, prior to the start-up, a target device among the PoC devices was about to switch from the low power mode to the high power mode;
  restricting the target device, if it was about to switch, to remain in the low power mode;
  otherwise, triggering the target device to switch to the high power mode.

Correspondingly, the first embodiments provide a processing device in a power-over-data cable (PoC) system, the system comprising power source equipment and plural PoC devices connected to the power source equipment, wherein the plural PoC devices are operable in a plurality of power modes comprising a low power mode and a high power mode, the processing device comprising at least one microprocessor configured for carrying out the steps of:
  reading, in memory of the processing device, a power change record to determine if, prior to the start-up, a target device among the PoC devices was about to switch from the low power mode to the high power mode;
  restricting the target device, if it was about to switch, to remain in the low power mode;
  otherwise, triggering the target device to switch to the high power mode.

In these embodiments, the information provided by the power change record points out the PoC device (e.g. camera) that triggered power overrun (at the port level or the system level), also referred to as the triggering cameras/devices, and thus a subsequent system reboot.

In that way, the invention may provide restricting the operating mode of this triggering device to a low power mode, in order to avoid a new power overrun due by the same device. This restriction eases the system power supply troubleshooting as well as reduces the system installation cost. In this way, the invention makes it possible to considerably reduce the risk of entering an endless fail/reboot loop caused by a power failure.

As a result, the cameras/devices which have not caused (or triggered) a power failure or overrun can be powered in a high power mode.

As described below, this approach based on the power change record makes it possible to automatically adjust the power management configuration of all the devices within a limited number of executions of steps of the invention (each time a tested device causes a power failure or overrun).

The method of the invention thus makes it possible to build, maintain and/or reset a system state according to camera and power supply status.

Optional features of embodiments of the invention are defined in the appended claims. Some of these features are explained here below with reference to a method, while they can be transposed into system features dedicated to any device according to embodiments of the invention.

In an embodiment, restricting the target device to remain in the low power mode includes setting a powering flag for the target device to a restricted low power mode, the powering flag being stored in a non-volatile memory of the processing device.

This provision makes it possible to keep the information on restricted powering state over time, as the processing devices may experience new failures in which case the target device should still be restricted to remain in the low power mode.

The restricted low power mode may relate to the "Port Failure" or "System Failure" or "Power Failure" statuses set in the power activation list or record described below.

In specific embodiments, the method further comprises a step of determining a powering flag for each PoC device by iterating the following steps on each PoC device having a powering flag set to a by-default low power mode:
  storing, in the power change record, an identifier of the PoC device considered;
  instructing the PoC device considered to switch to the higher power mode;
  if a switching acknowledgment is received from the PoC device considered, setting the powering flag of the PoC device considered to a high power mode; otherwise, setting the powering flag of the PoC device considered to the restricted low power mode, the powering flag being stored in a non-volatile memory of the processing device; and
  resetting the power change record after the powering flag is set.

This provision makes it possible to progressively build a list (power activation list below) of powering flags representing a stable configuration of the network of PoC devices. An efficient management of the PoC system may thus be performed based on such list, for instance when restoring the PoC system upon experiencing new power failures.

In further specific embodiments, the method further comprises a step of restoring the PoC system in a powering configuration as defined by the powering flags associated with the PoC devices, wherein the step of restoring comprises requesting (possibly each one) PoC devices whose associated powering flag are set to the high power mode, to switch into the high power mode.

This makes it possible to restore the PoC system in a stable and already validated configuration in case a power failure occurred when one of the devices attempted to switch to the high power mode.

The restoring may occur after a power failure happens, i.e. when no acknowledgment is received (or the processing device reboots, at system or port level), in which case the powering flag of the target or concerned tested device is set to the restricted low power mode.

The PoC system may consequently still operate efficiently, regardless of the device triggering a power failure.

In specific embodiments, the step of restoring further comprises resetting all the powering flags to a by-default low power mode if no switching acknowledgment is received from a PoC device in response to the request, i.e. if a device allowed to switch into the high power mode (as indicated by the powering flags) does not succeed in such switching upon request.

This situation means that the network configuration as defined by the powering flags is no longer a stable configuration. Thus, the above provision provides that a new stable configuration be found for the network of PoC devices, by starting from scratch (from a by-default configuration with minimum power consumption).

In other specific embodiments, the step of restoring further comprises: determining current power modes of the PoC devices; and requesting to switch into the high power mode only the PoC devices whose associated powering flag is set to the high power mode and for which the determined current power mode is the low power mode.

This approach limits the number of devices to restore into the high power mode. Such a process may occur when the PoC system experiences a partial system failure impacting a subset of the PoC devices. Indeed, a partial system failure such as a switch port failure results in the reboot of the sole devices connected to the same power source equipment port as the device having triggered the failure due to its switching to the high power mode.

A result of the above provision is a substantial reduction of the number of instructions (requests) to be sent to recover the stable configuration as defined by the powering flags, and thus the time needed to restore the PoC system.

In other specific embodiments, the method further comprises, before the step of restoring, a step of indicating in the power change record that the system is in a restoring state.

This indication helps the PoC system to detect non stable powering configuration as defined by the powering flags. Indeed, if the PoC system experiences a power failure during the restoring step, as indicated by the "restoring state" in the power change record, it means that the alleged stable configuration as defined by the powering flags is no longer stable.

In this situation, to avoid an endless loop of shutdowns and reboots, the powering flags may be reset, for instance to a by-default low power as already indicated above, in order to enter a new cycle of determining a stable powering configuration for the PoC network.

In yet other embodiments, the method further comprises:
determining current power modes of the PoC devices before restoring the PoC system; and
based on the determined current power modes of the PoC devices determining that a power failure impacted the whole power source equipment when the current power modes of all the PoC devices are low power modes or determining that a power failure impacted only a port of the power source equipment (i.e. a subpart of the PoC devices) when the current power mode of at least one PoC device is the high power mode.

This distinction between system failure and port failure makes it possible to adjust the restoring step to only a subpart of the PoC devices or not, thereby saving processing costs.

In some embodiments, the method further comprises, in case the read power change record is empty:
determining a list of PoC devices in the PoC system;
comparing the determined list of PoC devices with the PoC devices having an associated powering flag in the non-volatile memory of the processing device;
in case the comparison identifies slight changes or no change in the PoC devices, updating a list of powering flags to have one powering flag for each PoC device of the determined list of PoC devices (no updating in case of no change), and restoring the PoC system in a powering configuration as defined by the updated list of powering flags (the restoring as defined above),
in case the comparison identifies substantial changes in the PoC devices, resetting all the powering flags and determining a powering flag for each PoC device of the determined list (the determining may involve iterations as defined above).

This provision ensures the PoC system to dynamically adapt its powering configuration to the evolution of its structure (addition/removal of devices) in order to have a stable configuration, although the system experiences new failures that are not due to a specific device. In this approach the amount of processing to perform can be kept low, in particular in case of slight changes.

For instance, the comparison may identify slight changes in the PoC devices if there is no more than a predefined number of PoC devices that is added into or removed from the PoC system, for instance no more than one added device and one removed device.

In embodiments, the processing device is one PoC device selected from the PoC devices powered by the power source equipment in the PoC system. It means that one of the PoC device acts as a master device in the power management. This is because it is the only device having knowledge of the stable network configuration and thus the only device than instructs the other ones to efficiently switch to the optimum powering mode.

In a variant, the processing device is the power source equipment. Indeed, the power source equipment advantageously manages all the PoC devices.

The start-up of the power source equipment may be a general start-up after a system failure, or may be a partial start-up if only one port failed.

In embodiments, the method further comprises transmitting a list of the powering flags to a monitoring system external to the PoC system. This is to provide feedback to an operator.

In some embodiments, the method further comprises resetting the power change record before restricting or switching the target device. This is particularly useful in case of switching the target device, to avoid considering this target device as a device causing a power failure in case such a power failure occurs for any other reason before the power change record is reset.

In some embodiments focusing on the slave devices, the method may further comprise the following steps, performed by one PoC device different from said processing device:

receiving, from the processing device, a request to switch into the high power mode;

internally switching into the high power mode by starting powering at least one functional unit; and waiting for a boot end message from the functional unit in response to the internal switching, before acknowledging the switching to the processing device.

The request to switch may be any request or instruction of such switching as previously mentioned.

This provision makes sure that the slave PoC devices are stable before they acknowledge the switching to the high power mode. This is to avoid switching slave PoC devices to cause a power failure while the master/processing device has already reset its power change record.

In some embodiments, the processing device is the target device. In other words, each PoC device may manage its own restriction to low power mode in case it is liable to cause power failures. This illustrates a power management distributed over the PoC devices.

In specific embodiments, each of the devices powered over cable by the power source equipment reads a local (in local memory) power change record upon starting up to determine if it was about to switch from the low power mode to the high power mode before starting up, and restricts itself to remain in the low power mode in case it was about to switch or otherwise switches itself to the high power mode.

This provision clearly illustrates the distributed power management, since each PoC device performs the power restriction or power switch by itself.

In some specific embodiments, the method further comprises:

determining a list of PoC devices in the PoC system;

iterating the following steps on each PoC device of the determined list:

setting the power change record to the PoC device under consideration;

if the PoC device under consideration is the processing device (i.e. local and target PoC device), powering itself to the low or high power mode according to the value of a local powering flag and notifying the other PoC devices of the powering;

otherwise, waiting for a notification (usually an acknowledgment of powering) of the PoC device under consideration notifying its powering;

resetting the power change record after sending or receiving the notification.

It may be noted that the iterations may be suddenly stopped in case a power failure forces the local PoC device to reboot.

The above provision is preferably performed simultaneously by all the devices. A distributed power management of the PoC system is thus obtained.

The synchronization of the same iterations between the devices simultaneously performing the same iterations is guaranteed by the above-mentioned notifications. Indeed, a new PoC device can be considered only once the notification of the previous PoC device has been sent and received.

In embodiments according to the invention, the low and high power modes are additional to a standby mode and/or an off (or shutdown) mode.

It means that the two low and high power modes are modes in which the PoC device is active and operational. Of course, more than two active and operational power modes can be considered within the scope of the invention.

In some embodiments, in the low power mode, only a network communication subsystem of a given PoC device is operable.

This is to have a stable by-default configuration of the network (i.e. where all the PoC devices are in the low power mode) which makes it possible to allow a power management as described above through message exchanges.

In some embodiments, in the high power mode, a given PoC device fully operates with all of its subsystems, e.g. the camera acquisition and processing module for a digital video surveillance system in which the devices are PoC cameras.

This is to have a maximum of devices which operate the function they are intended for, e.g. video surveillance.

In some embodiments, the power change record is stored in a non-volatile memory of the processing device.

Embodiments of the invention also relates to a computer program product for a programmable apparatus, the computer program product comprising instructions for carrying out each step of any method as defined above when the program is loaded and executed by a programmable apparatus.

Embodiments of the invention also relates to a non-transitory computer-readable medium storing a program which, when executed by a microprocessor or computer system in a device of a power-over-cable system, causes the device to perform any method as defined above.

The non-transitory computer-readable medium may have features and advantages that are analogous to those set out above and below in relation to the methods and node devices.

Embodiments of the invention relates to a method of managing power in a power-over-data cable system, substantially as herein described with reference to, and as shown in, FIG. 6, or FIG. 6 and one or more of FIGS. 7 to 11, or FIG. 12 of the accompanying drawings.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium, and in particular a suitable tangible carrier medium or suitable transient carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION OF EMBODIMENTS OF THE INVENTION

Invention comes within the scope of Power-over-Cable (PoC) systems in which one or more network switches supply power to and convey data with devices, over the same network links or "cables". These devices may be referred to as PoC devices.

PoC architectures find application in various technical fields. For instance such a PoC system may concern a network of PoC cameras for digital video surveillance, or a network of PoC printers for printing applications, or a network of PoC telemeters for remote measuring applications.

Of course, other applications may implement the invention as presented below, although focus is made on digital video surveillance for the sake of illustration.

Figure 1:
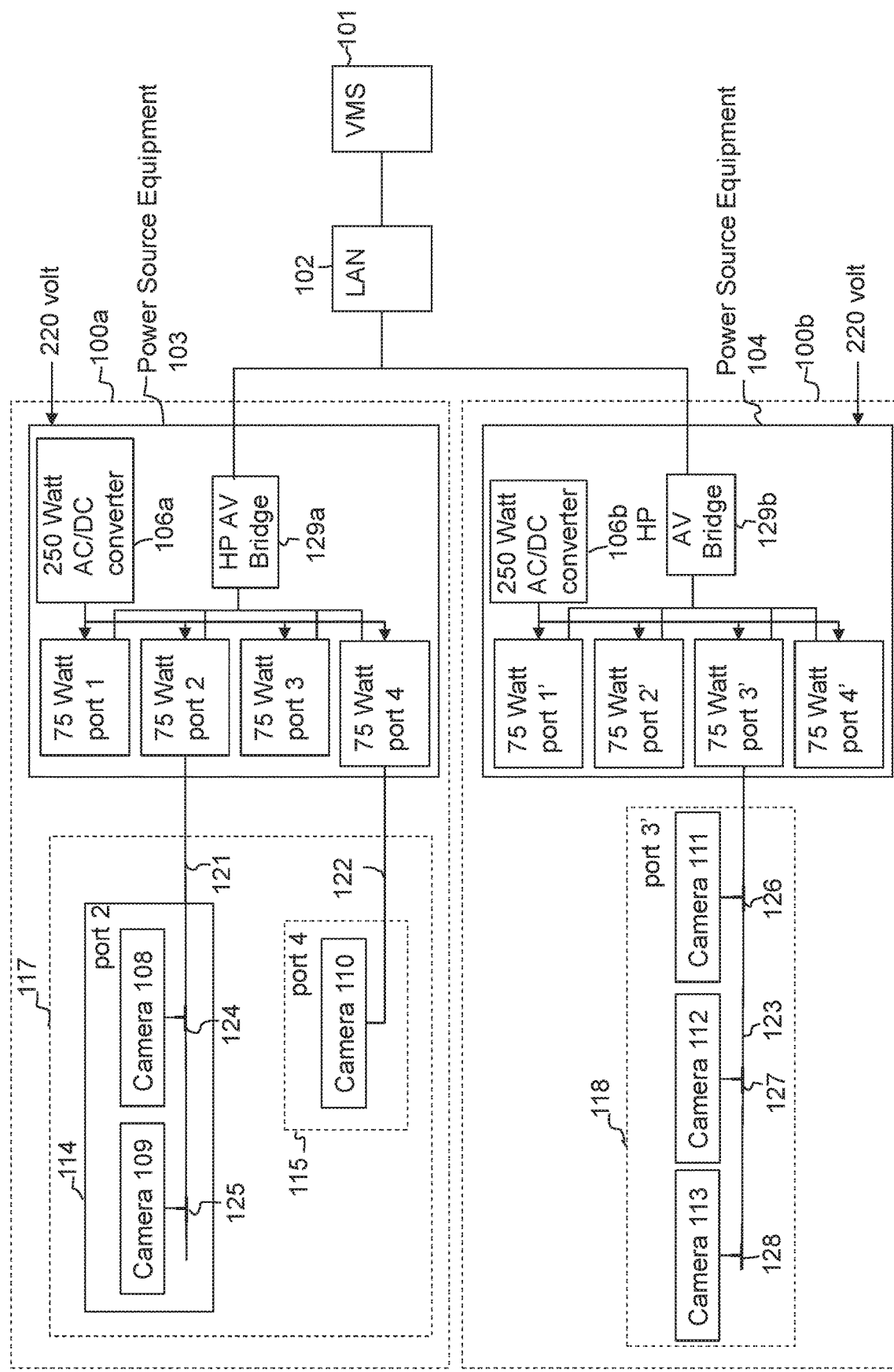
FIG. 1 illustrates a typical example of a video surveillance system using an IP over Coax video network.

FIG. 1 illustrates a typical example of a video surveillance system using an IP over Coax video network. The video surveillance system comprises cameras which are supplied with power by a network equipment device such as a power source equipment device, using coax cables. The same coax cables are used for data communication with the power source equipment, which thus also acts as a data switch, to switch data to or from a LAN infrastructure 102. Below the words "power source equipment", "PSE" and "switch" are indifferently used to designate the same equipment device in the network.

According to the example of FIG. 1, PoC cameras (e.g. COAX cameras) 108 to 113 of the video surveillance system are divided into two camera group sets 117 and 118 which are part of two independent PoC systems 100a and 100b each of which includes power source equipment, PSE, or "switch" 103 or 104. The camera group sets 117 is powered by the corresponding PSE 103 which also connects the cameras 108 to 110 to the LAN infrastructure 102, and the camera group sets 118 is powered by another PSE 104 which also connects the cameras 111 to 113 to the LAN infrastructure 102.

The LAN infrastructure 102 comprises at least switches, routers and gateways that are necessary to transport the data, e.g. IP video data to a Video Monitoring System (VMS) 101 of the video surveillance system. The VMS 101 is configured to display the IP video streams for surveillance purposes.

The PSEs 103 and 104 are configured to provide power to the cameras 108 to 113 through coax cables 121, 122 and 123.

They also provide communication capabilities with the cameras. For instance, they encapsulate uplink IP LAN traffic received from the LAN infrastructure 102 over a LAN interface into packets suitable for digital data transport on Coax such as HomePlug AV packets. Then they transmit these packages to the cameras over the coax cables using Coax interfaces.

The PSEs 103 and 104 also extract IP LAN traffic from the HomePlug AV packets received from the cameras on the coax interfaces and then forward them on the LAN interface to the LAN infrastructure.

According to an embodiment, each of the PSEs 103 and 104 comprises a HomePlug AV bridge (e.g. the HomePlug AV bridges 129a and 129b) configured to perform the above-mentioned encapsulation and transmission of the HomePlug AV packets.

The coax cables 121 to 123 may connect one or more cameras with or without use of cable connectors. A cable connector is known to extend the number of cameras that can be connected to a coax cable.

In the example of FIG. 1, the camera 110, e.g. a COAX camera, is directly connected to the coax cable 122 without using any cable connector. On the other hand the cameras 108 and 109 are connected to the coax cable 121 respectively by cable connectors 124 and 125. Similarly, the cameras 111 to 113 are connected to the coax cable 123 respectively by cable connectors 126 to 128.

The cable connectors are for instance T style connectors. One model of connectors is Ultra BNC Coax Cable Adapter Products.

The PSEs 103 and 104 are not represented with full details in FIG. 1 for the sake of simplicity. Only the power supply details are kept as they relate to power supply management. For implementation, one example of the PSEs 103 and 104 is the NV-ER1804 TBus from NVT.

As an example, the PSE 103 gets power from a standard AC power outlet (110 or 220 volts). The AC power is converted, by an AC/DC converter 106a, to a DC power of for example 48 or 56 volts, which is suitable to be provided to the cameras 108 to 110 of the PoC system 100a.

In the example illustrated in FIG. 1, the AC/DC converter 106a can handle up to 250 Watt of total power. The DC power is distributed from the AC/DC converter 106a to each of ports 1 to 4 of the PSE 103. Each of the ports 1 to 4 has its own power protection to limit the amount of power that can be drawn from the port, for instance due to the cable hardware used. Such a limited amount of power is considered as a port power capacity of the port. In this example it allows up to 75 Watts to be drawn respectively from each of the ports 1 to 4 of the switch 103.

All the PoC cameras powered by the same port of the PSE are considered as a camera subset of the camera group set in the PoC system considered. For example, the cameras 108 and 109 are part of the same camera subset 114 because they are both connected to the same port 2 of the PSE 103 via the coax cable 121. These two cameras 108 and 109 share thus a port power capacity of 75 Watt.

On the other hand, the camera 110 is the single member of the camera subset 115 and has access to a port power capacity of 75 Watts from the port 4 of the PSE 103 via the coax cable 122.

The camera subset 114 and 115 are part of the camera group set 117, and thus share the overall power capacity of the PSE 103 as 250 Watts in this example. It means that the sum of the power consumed in each of the camera subset included in the camera group set 117 must not exceed 250 Watts.

It is to be noted that the AC/DC converters 106a cannot handle the situation where all ports 1 to 4 would deliver their full port power capacities. That is why an efficient power management is required at port and switch levels to limit power overrun.

Similarly, the PSE 104 also gets power from a standard AC power outlet (110 or 220 volts). All of the cameras 111 to 113 of the camera group set 118 are connected to the port 3' of the PSE 104 via the coax cable 123. The cameras 111 to 113 thus share a port power capacity of 75 Watts from the port 3' of the PSE 104. The camera group set 118 can use the overall power capacity of the PSE 104 as 250 Watts.

As mentioned above, the two camera group sets 117 and 118 are part of the two independent PoC systems 100a and 100b. The power distributions of the two PoC systems are respectively constrained at least at the above-mentioned two levels—port level for a total of 75 Watts and system or PSE level for a total of 250 Watts. The invention regards a PoC system comprising a power source equipment device and plural PoC devices connected to the power source equipment device, one example of which has just be described with reference to FIG. 1. In order to avoid entering an endless loop of shutdowns and reboots of such PoC system, embodiments of the invention provide that:

the plural PoC devices, such as the PoC cameras, are operable in a plurality of power modes including a low power mode and a high power mode. In the low power mode, only the network communication subsystem of the device is operable; while in the high power mode, the main function of the device is also operable (in addition to the communication subsystem). Although various levels of high power may be contemplated, a full high power mode may provide all the subsystems of the device to be operable, e.g. the camera acquisition and processing modules for a digital video surveillance system in which the PoC devices are cameras, in particular coax cameras;

one processing device, e.g. from among the power source equipment and the PoC devices connected thereto, performs the following steps, upon starting up:

reading, in memory of the processing device, a power change record to determine if, prior to the start-up, a target device among the PoC devices was about to switch from the low power mode to the high power mode;

restricting the target device, if it was about to switch, to remain in the low power mode;

otherwise, triggering the target device to switch to the high power mode.

According to an embodiment, the power change record is stored in a non-volatile memory of the system accessible by the processing device.

A PoC device (e.g. a PoC camera) that causes a power failure in the system, referred to as "triggering device" or "failure triggering device" below, can thus be detected and determined upon restarting after reboot thanks to the in-non-volatile-memory record previously set to store an id of this PoC device that was about to switch to the high power mode. The failure triggering device can thus be excluded from being powered to a high power mode again, thus preventing this failure triggering device from entering a loop of shutdowns (i.e. power failures) and reboots when the PoC system partly or entirely reboots after such power failure.

Iterations on the above approach make it possible to progressively define a stable configuration of the PoC system, that is to define which PoC devices are allowed to be switched into the high power mode and which PoC devices are restricted to remain in the low power mode.

Preferably, restricting the target device to remain in the low power mode includes setting a powering flag stored in the processing device non-volatile memory for the target device to a restricted low power mode.

The processing device, either one of the PoC device or the PSE, thus durably stores the powering configuration regarding the failure triggering device. A stable configuration may be stored using a powering flag for each PoC device of the PoC system.

The powering flags may be all stored in the same processing device, for instance in the PSE 103 or 104 of the PoC system or in one of the PoC devices referred to as master device. This illustrates a master/slave approach of the power management method, an exemplary implementation of which being described below with reference to FIGS. 6 to 11.

On the other hand, the powering flags may be distributed over the PoC devices of the PoC system, each having a powering flag storing its own powering configuration. An exemplary implementation of such a distributed approach is described below with reference to FIG. 12.

Exemplary functional structures of the PoC devices and of the PSE of a PoC system are now described with reference to FIGS. 2 and 3, in the context of a digital video surveillance system, i.e. where the PoC devices are PoC cameras as shown in FIG. 1.

Figure 2:
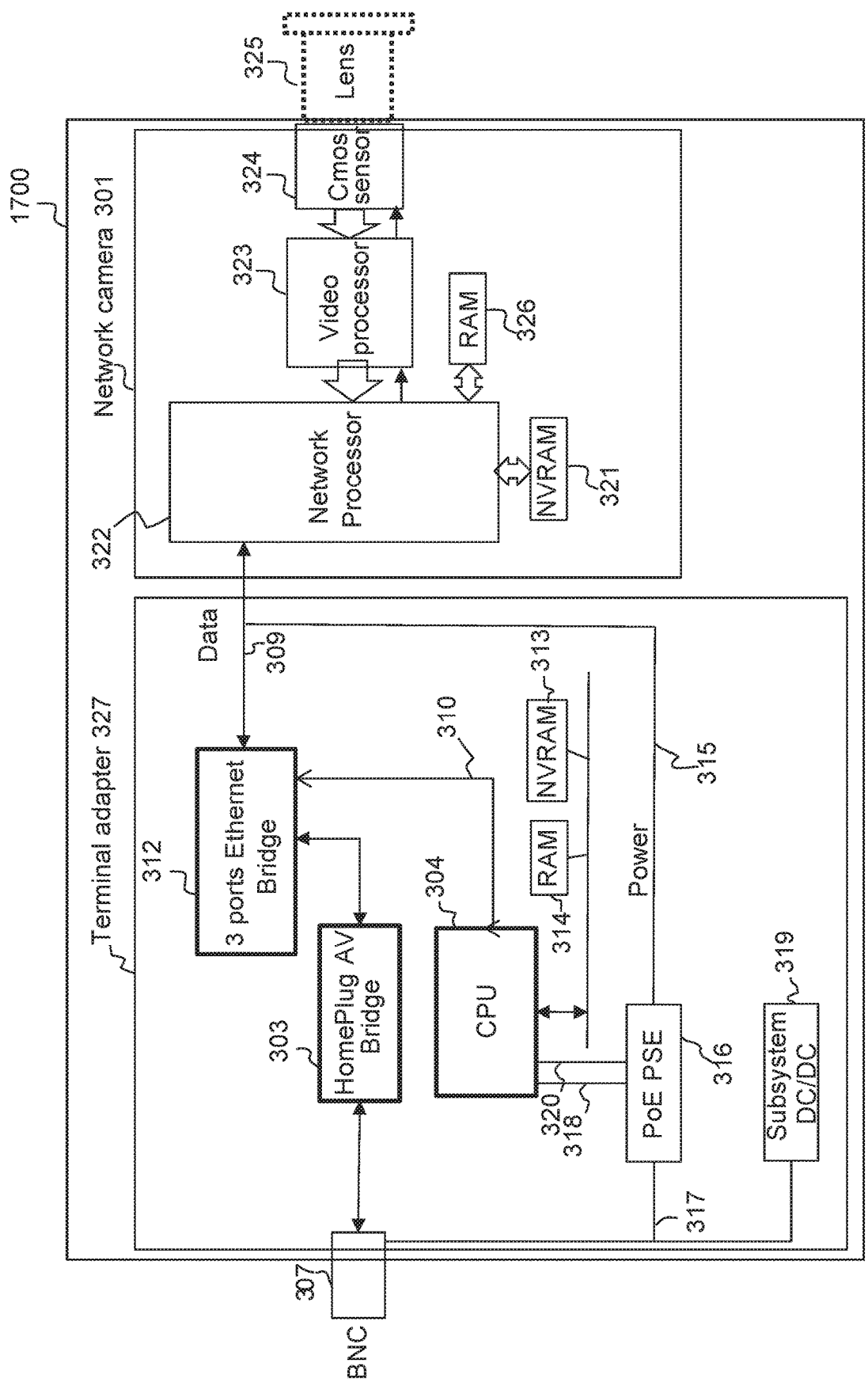
FIG. 2 illustrates a simplified functional block diagram of an example of an IP surveillance camera of FIG. 1 according to an embodiment of the invention.

FIG. 2 illustrates a simplified functional block diagram of an example of an IP surveillance camera 1700 according to an embodiment of the invention, that is powered over cable by the PSE 103 or 104. The cameras 108 to 113 of the video surveillance system as illustrated in FIG. 1 can be functionally and/or structurally similar to the IP surveillance camera 1700.

According to an embodiment, the IP surveillance camera 1700 comprises a network camera (core camera unit) 301 and a terminal adapter (such as an EoC adapter—or Ethernet-over-Cable adapter) 327. According to embodiments of the invention, the network camera 301 and the terminal adapter 327 are integrated into a same device.

In some other embodiments of the invention, instead of being integrated into the camera 1700, the terminal adapter 327 is an external element to the network camera 301. In these other embodiments, the terminal adapter 327 may be connected to the network camera 301 using an Ethernet cable. The network camera may thus integrate a well-known RJ45 interface.

The network camera 301 comprises conventional camera elements and functions, i.e. a camera acquisition and processing modules, such as the optics, a sensor, a video processor and a RTP/IP video server which are hereafter described in a simplified manner. According to the example illustrated in FIG. 2, the network camera 301 comprises a lens 325, a Cmos sensor 324, a network processor 322, a video processor 323, a non-volatile memory (such as a NVRAM) 321 and a random access memory (RAM) 326. According to an embodiment, the NVRAM 321 and the RAM 326 are accessible by the network processor 322.

According to an embodiment, the terminal adapter 327 corresponds to the communication subsystem and comprises elements and functions of Ethernet transmission over coaxial cable and power management. According to the example illustrated in FIG. 2, the terminal adapter 327 comprises a connector port 307, a central processing unit (CPU) 304 working with a non-volatile memory (such as a NVRAM) 313 and a random access memory (RAM) 314, an Ethernet bridge 312, a subsystem DC/DC converter 319, a PoE PSE (PoE=Power over Ethernet, PSE=Power Sourcing Equipment) module 316, and a HomePlug AV bridge 303.

The connector port 307 is used by a cable connector to connect the camera 1700 to a coax cable (such as the coax cables 121 to 123 in FIG. 1) for IP communication and powering over coax cable. According to an embodiment, the connector is a Bayonet Neill-Concelman (BNC) connector and the connector port 307 is thus a BNC connector.

The camera 1700 obtains its power via the BNC port 307. The power is directed through a line 317 to both of the subsystem DC/DC converter 319 and the PoE PSE module 316. The PoE PSE module 316 provides power to the components of the terminal adapter 327 (e.g. CPU 304) through line 318 and power to the network camera 301 through line 315. As explained below, the PoE PSE module 316 can receive instructions from CPU 304 through line 320 to start powering or end powering the network camera 301 through line 315.

The elements 312, 303, 304, 314, 313, 316, 319 of the terminal adapter 327 form a communication subsystem of the terminal adapter 327.

According to an embodiment of the invention, a camera (such as the camera 1700) may be possibly powered in one of a plurality of power modes, which depends on the degree of power consumption required by the functions performed by the camera, the port power capacity of a port via which the camera 1700 is supplied with power, and the overall power capacity of the PSE to which it is connected in the PoC system.

For ease of illustration of embodiments of the invention, the plurality of power modes is simplified to comprise a low power mode and a high power mode. The invention is nevertheless not limited to any number of power modes in which a camera can be powered. For instance a plurality of graduated "high" power modes may be provided to offer various levels of functionalities, e.g. various processing by the network camera 301.

According to an embodiment of the invention, when a camera is powered in the low power mode, the camera only uses the basic communication functions, meaning that no power is provided to the network camera 301 through line 315. When a camera is powered in the high power mode, the camera is fully functional, which means the main function of video acquisition (camera) is operable. In other words, the network camera 301 is powered by the PoE PSE 316 through line 315.

By default, all of the PoC cameras are booted in the low power mode, thereby ensuring that a (re)booting configuration is stable.

The DC/DC converter 319 provides power to the camera 1700 in particular to the communication subsystem of the terminal adapter upon starting up.

The PoE PSE module 316 is configured to drive the powering of the network camera 301 when it is decided to switch and power the camera 1700 in the high power mode. The PoE PSE module 316 is controlled by the CPU 304 through an "ON" signal (line 320). By acting on the signal 320, the CPU 304 controls a switch between the low power mode and the high power mode. An "OFF" signal 320 may be used to switch back from the high power mode to the low power mode, when necessary.

The HomePlug AV bridge 303 is part of the communication subsystem and is configured to encapsulate a Camera IP traffic into HomePlug AV packets and to send the HomePlug AV packets on a coax cable via the BNC port 307. The HomePlug AV bridge 303 is also used to extract IP traffic from a received HomePlug AV packet and to forward the extracted IP traffic to the network camera 301, through the Ethernet bridge 312. The HomePlug AV bridge 303 can be, for example, a dLAN 200 AVmodule (INT6400) from Devolo.

The Ethernet bridge 312 is configured to mix IP traffics received from the CPU 304 through line 310, received from the HomePlug AV bridge 303 and received from the network camera 301. Communication between the Ethernet bridge 312 and the network camera 301 is made through line 309, which may be implemented by an Ethernet cable if the terminal adapter 327 is an external element to the network camera 301.

Figure 13:
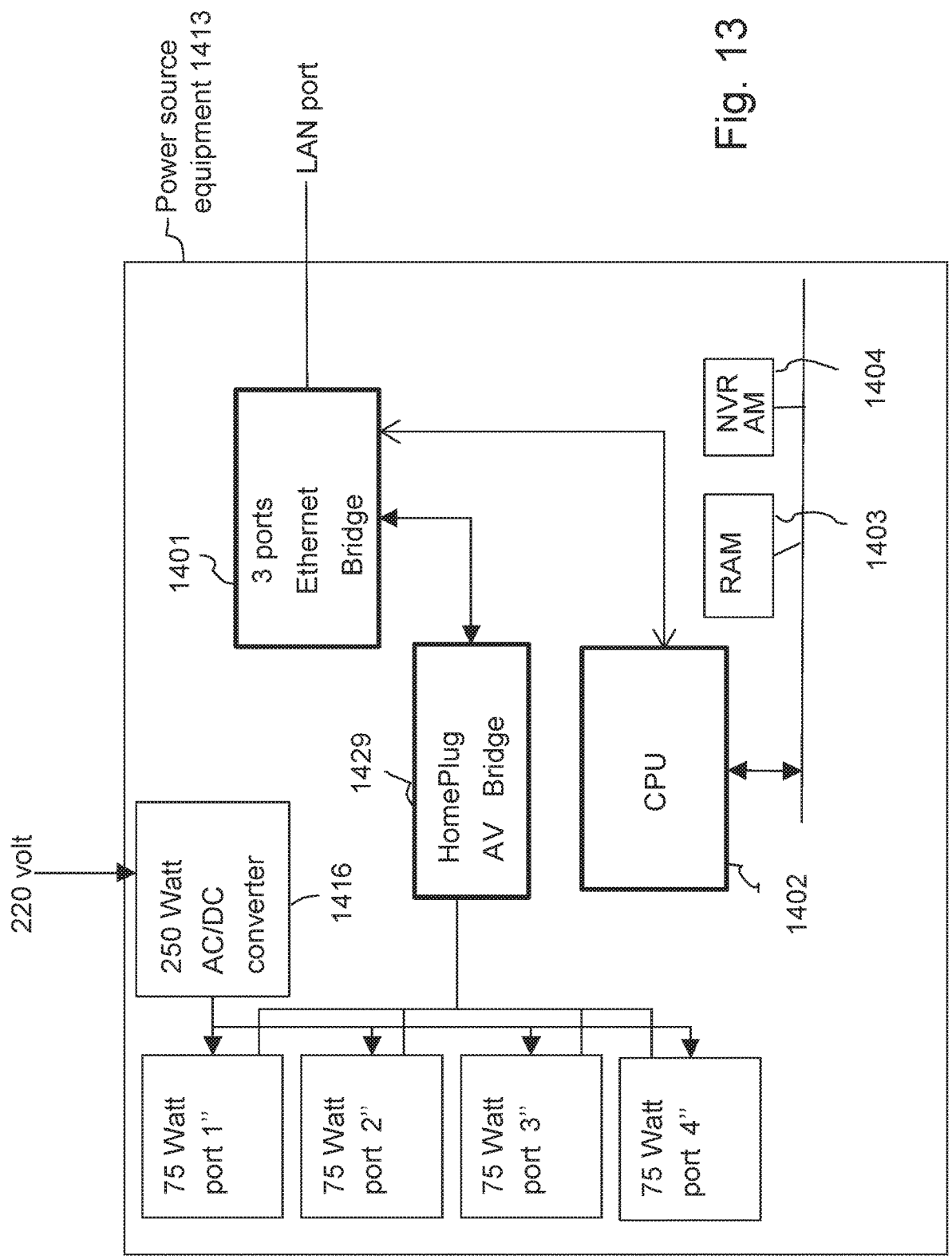
FIG. 13 illustrates an exemplary structure of a switch of FIG. 1 according to an embodiment of the invention.

FIG. 13 illustrates an exemplary structure of the PSE 103 or 104 of the PoC system. An example of such PSE is a HomePlug AV receiver.

The PSE 1413 comprises an AC/DC converter 1416, a HomePlug AV bridge 1429, a CPU 1402, a Ethernet bridge 1401, a non-volatile memory (NVRAM) 1404 and a random access memory (RAM) 1403. It is thus quite similar to the terminal adapter 327 as described above, except that it receives its power from a standard AC power outlet rather than from a coax cable.

The PSE 1413 suffers from the power limitation at port level and/or at system level as explained above.

The HomePlug AV bridge 1429 is responsible for encapsulating Ethernet traffic from the Ethernet bridge 1401 into HomePlug AV packets and to send them on the Coax cables. The HomePlug AV bridge 1429 is also responsible to extract IP traffic from the received HomePlug AV packets and to forward this IP traffic to the Ethernet bridge 1401.

The Ethernet bridge 1401 is responsible for mixing IP traffics from the LAN port, the HomePlug AV bridge 1429 and the CPU 1402.

As previously mentioned, the invention may be implemented through a master/slave approach or through a distributed approach, depending on various factors such as the hardware capacity and the user preference.

In the master/slave approach, the powering configuration of the PoC devices is stored in one and single processing device of the PoC system, all the other PoC devices being slaves in the meaning they receive their instructions to switch to another power mode from the one and single processing device.

In embodiments, the processing device performing the main steps of the master/slave approach is one PoC device selected from the PoC devices (e.g. PoC cameras) powered over cable by the PSE. Such device is named master device or master camera in the context of a video surveillance system.

In other embodiments, the processing device performing the main steps of the master/slave approach is the PSE.

In the master camera approach, any of the PoC cameras of the camera group set is possible to be selected to be a master camera configured to execute steps of the power management method of the invention, for instance as described below with reference to FIGS. 6 to 10, and the rest of the PoC cameras function accordingly as slave cameras, for instance as described below with reference to FIG. 11. There are several existing algorithms, for example the Naxos algorithm or the Raft algorithm, that can be used to select one master node and slave nodes from among identical nodes (e.g. identical cameras) and a PSE.

Various embodiments may be derived from the master/slave approach.

In first embodiments, referred to as a master/slave integrated camera mode, the network camera 301 and the terminal adapter 327 are both integrated into each of the cameras 1700 as a single piece. All steps of the power management method, either at the master side or at the slave side are executed by the CPU 304 (respectively of the master PoC camera and of the slave PoC cameras). For instance, the power change record is stored in NVRAM 313. This mode presents advantages in terms of cost and maintainability.

In other embodiments, referred to as master/slave modular camera-focused mode, the network camera 301 has an external terminal adapter 327 which is not integrated into the camera 1700. The steps of the power management method at the master side are executed by the network processor 322 of the network camera 301 of the master PoC camera, while the steps of the power management method at the slave side are executed by the CPU 304 of the external terminal adapter 327 of each slave PoC camera. For instance, the power change record is stored in NVRAM 321 of the master PoC camera.

Various messages enabling synchronization or information exchange within each camera or between the cameras are provided as described below with reference to FIG. 4.

This mode presents advantages in terms of modularity.

In other embodiments, referred to as master/slave modular adaptor-focused mode, the network camera 301 has an external terminal adapter 327 which is not integrated into the camera 1700. All steps of the power management method at the master side are executed by the CPU 304 of the external terminal adapter 327 of the master camera (power change record is stored in NVRAM 313), while the steps of the power management method at the slave side are executed by the CPU 304 of the external terminal adapter 327 of each slave PoC camera. This mode is advantageously adaptable to any existing network camera.

In yet other embodiments, referred to as a PSE-centric approach, the steps of the power management method at the PSE (master) side are executed by the CPU 1402 of the PSE 1413 (the power change record is stored in NVRAM 1404), and the steps of the power management method at the slave side are executed by the CPU 304 of the external terminal adapter 327 of each PoC camera. This mode has advantageously low complexity at the PoC device's ends, since the management mainly resides in the PSE.

Also various embodiments may contemplated for the distributed approach, in which all of the PoC cameras belonging to the same PoC system (e.g. 100*a* or 100*b*) actively participate to the execution of the steps of the invention.

In embodiments, referred to as a distributed integrated camera mode for each of the cameras of the PoC system considered, the network camera 301 and the terminal adapter 327 are both integrated into the camera. All steps of the power management method are executed by the CPU 304 of each PoC camera in a similar manner: the power change record is stored in NVRAM 313 together with a power activation record (described below) storing the last known working power status of the PoC camera. This mode presents advantages in terms of cost and maintainability.

In other embodiments, referred to as a distributed modular camera mode, for each of the cameras of the PoC system, the network camera 301 has an external terminal adapter 327 which is not integrated into the camera. All steps of the power management method are executed by the CPU 304 of the terminal adapter 327 of each PoC camera, in a similar manner. This mode presents less complexity since there is no need to execute a master election algorithm.

Focus is now made on master/slave exemplary implementations. As mentioned above, the invention relies on the use of a power change record stored in a non-volatile memory of the master processing device, either a master PoC device or the PSE, in order to identify a failure triggering PoC device, and thus to take appropriate actions to restrict this failure triggering PoC device to the low power mode only. An exemplary data structure for a power change record 410 is shown in FIG. 3*a*.

The restriction to the low power mode can be stored in a powering flag, in a non-volatile memory of the master processing device also. A powering flag may thus be determined and set by the master processing device for each PoC device it manages. In the examples below, the powering flags are grouped within a power activation list, for instance as shown in FIG. 3*a* by reference 400.

Figure 3A:
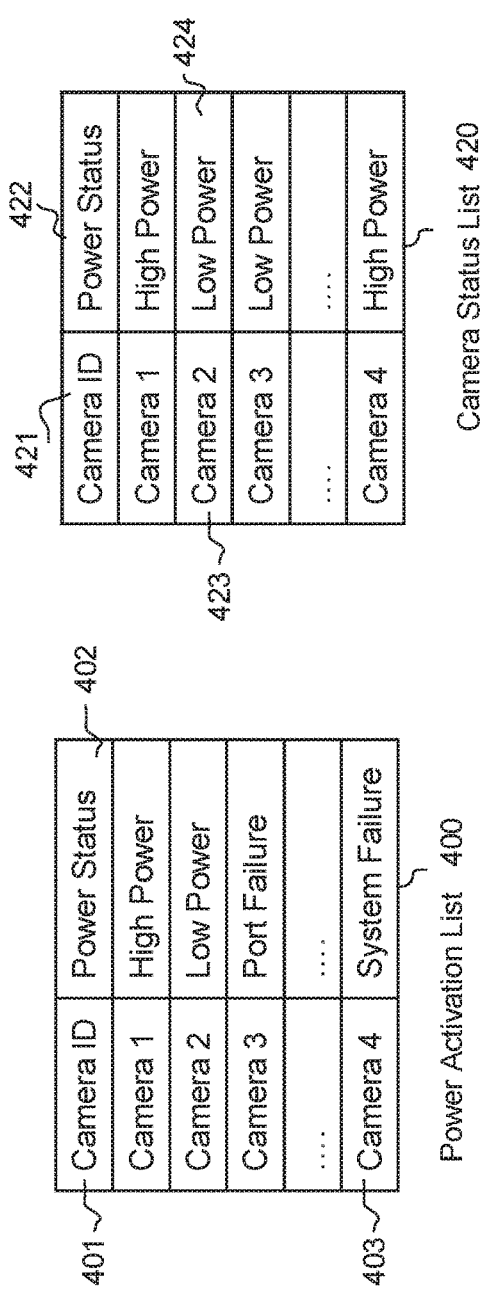
FIG. 3a illustrates various data structures used by exemplary power management methods of the invention based on a master/slave approach.

FIG. 3*a* illustrates various data structures used by exemplary power management methods of the invention based on a master/slave approach, in particular the power activation list 400, the power change record 410 and a camera status list 420.

The power activation list (PAL) 400 is stored in a non-volatile memory, for instance in a NVRAM of the master processing device.

According to embodiments of the invention, the power activation list 400 comprises, for each of the PoC cameras of the same PoC system, a last known working power status of the PoC camera.

According to an example of the power activation list 400 shown in FIG. 3*a*, a camera ID column 401 comprises camera identifiers of the PoC cameras belonging to the same PoC system (e.g. Cameras 1 to 4), and a power status column 402 of powering flags is used to store for each of the PoC cameras a corresponding last known working power status. In other words, the power activation list 400 reflects the latest stable configuration of the PoC system.

The camera identifier of a PoC camera may be represented by a HomePlug AV MAC address of the PoC camera (represented in a format of 48-bit MAC address). According to an embodiment, a powering flag may take a value from at least four power statuses listed as follows:

"Low Power" (i.e. low power mode): the PoC camera is powered in the low power mode and has not yet been asked to switch to the high power mode. This is the by-default status or mode of each PoC camera when the PoC system starts from scratch or reboot, or when the PAL list 400 is reset. This is because the by-default status should mirror the least power-constrained configuration;

"High Power" (i.e. high power mode): the PoC camera can be powered in the high power mode, because it did not cause any power failure when previously switched to this high power mode;

"Port Failure" (also known as "port power failure"): the PoC camera causes a PSE port failure (maximum power of the port was exceeded by connected PoC cameras) when an attempt to switch it to the high power mode was performed. The PoC camera is thus restricted to remain in the low power mode due to the port failure;

"System Failure" (also known as "system power failure"): the PoC camera causes a PSE (or system) failure (maximum power of the PSE was exceeded by connected PoC cameras) when an attempt to switch it to the high power mode was performed. The PoC camera is thus restricted to remain in the low power mode due to the system failure.

In the example of the Figures, the camera 403 (with its camera identifier as "Camera 4") has a power status or a powering flag set to "System Failure" in the power activation list 400, corresponding to a restricting low power mode. This is because the camera 403 as being in the low power mode caused a system shutdown when the camera attempted to switch to the high power mode. Therefore, to avoid another system shutdown when the same camera 403 will be asked to switch again to the high power mode, its powering flag is set to "System Failure" to restrict it to remain in the low power mode (and thus no request to switch will be sent again).

Indeed, as this is the master processing device that requests the PoC devices to switch to the high power mode, this powering flag indicates the master processing device not to request the failure triggering PoC device to switch again to high power mode.

In this way, the power activation list 400 reflects which PoC camera(s) can be switched again to the high power mode without causing a power failure.

Figure 7:
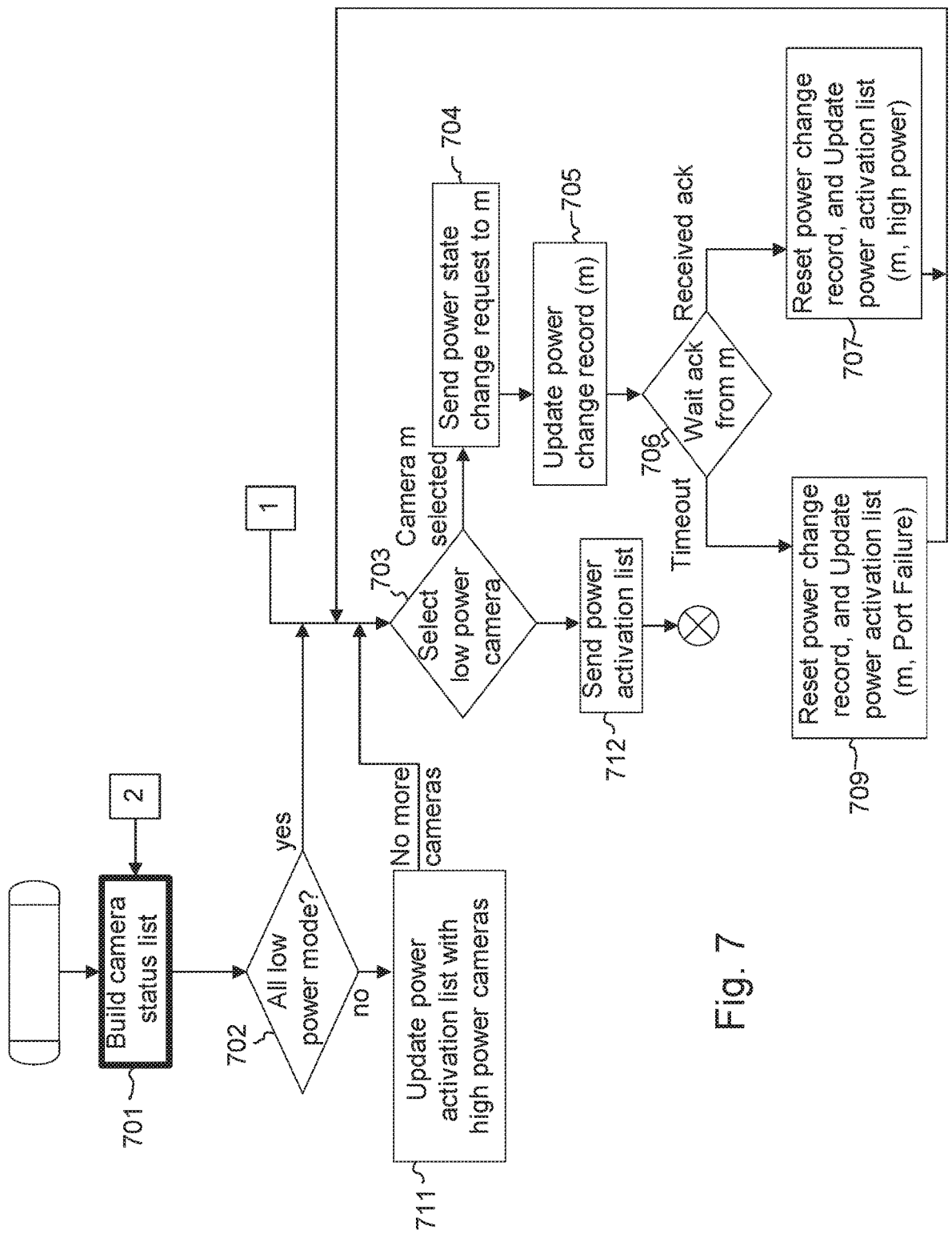
FIG. 7 illustrates, using a flowchart, steps of building a power activation list in the process of FIG. 6.
Figure 8:
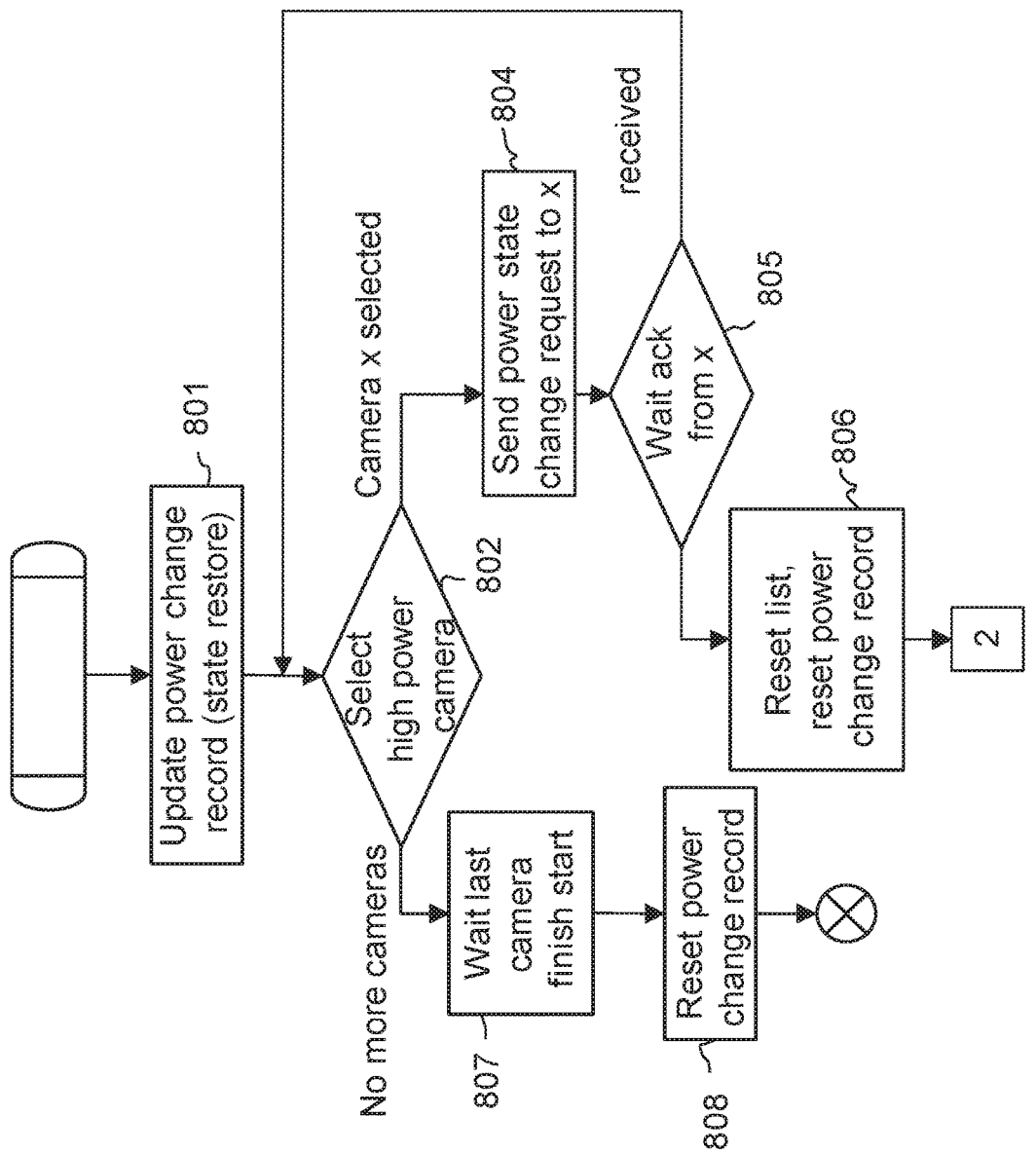
FIG. 8 illustrates, using a flowchart, steps of restoring the full PoC system based on a power activation list, in the process of FIG. 6.
Figure 10:
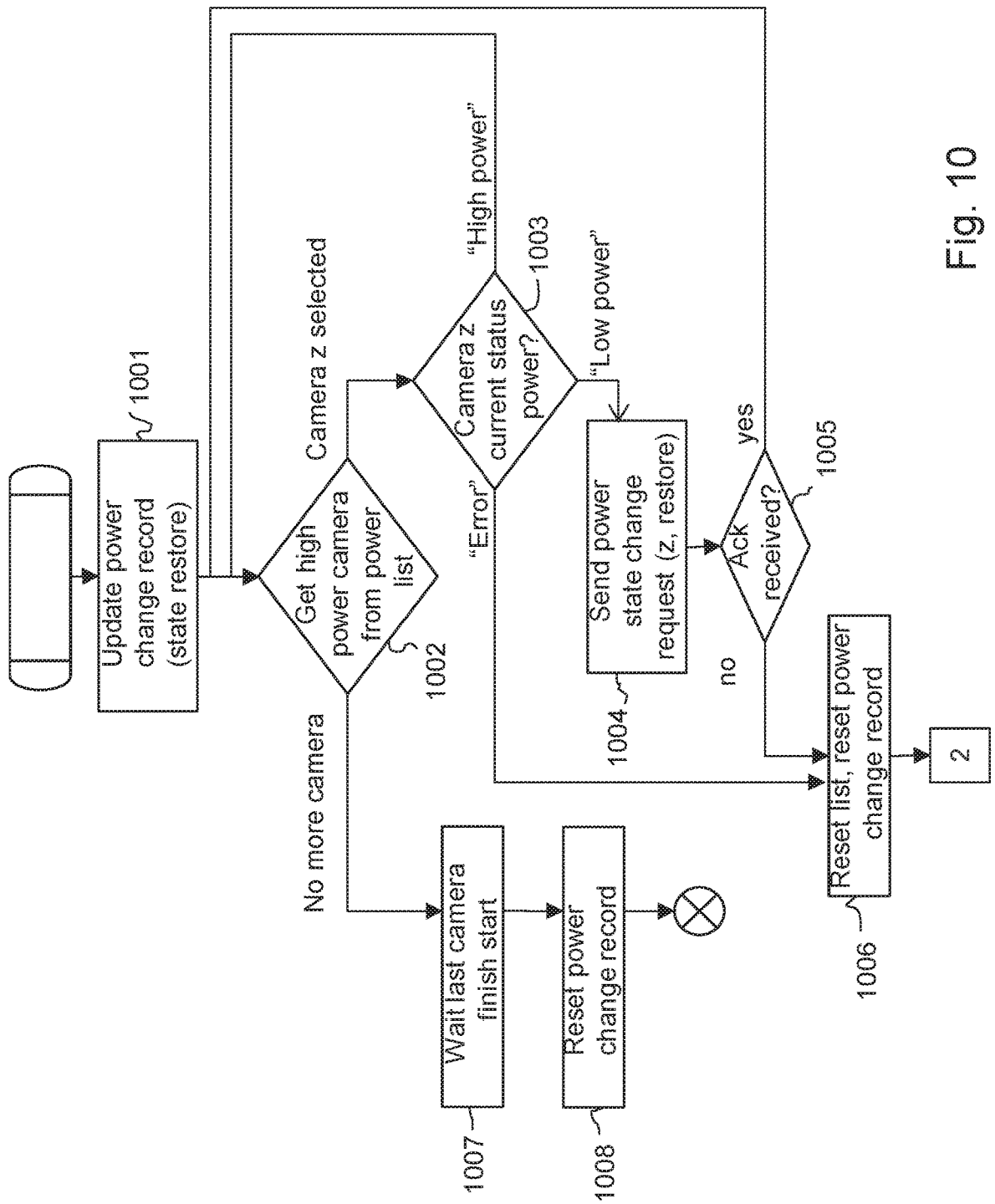
FIG. 10 illustrates, using a flowchart, steps of partially restoring the PoC system based on a power activation list, in the process of FIG. 6.

Steps of building the power activation list 400 are illustrated in FIG. 7, and in the following related paragraphs. Use of the power activation list 400 to, restore the PoC system after a failure and thus after a reboot are illustrated in FIGS. 8 and 10, and in the following related paragraphs.

In addition, according to an embodiment, the power activation list 400 can be transmitted from the master processing device to a video monitoring system (such as the VMS 101 as illustrated in FIG. 1) so that the power activation list 400 can be displayed by the VMS 101.

Still referring to FIG. 3a regarding a master-slave configuration of the invention, the power change record 410 is managed by the CPU 304/322/1402 of the master processing device (either a master PoC camera or the PSE 103/104). The power change record 410 is stored in a non-volatile memory, in particular in a NVRAM.

As shown, the power change record 410 comprises a power change camera ID field 411 used to store a camera ID for keeping track of a PoC camera that is about to switch from the low power mode to the high power mode, usually upon request from the master processing device.

Therefore, in case the switching attempted by the PoC camera whose camera identifier is stored in the power change camera ID field 411 causes power failure at the port level or the PSE level, the power change record 410 thus indicates the failure triggering PoC camera. Upon starting-up (rebooting) after a failure, the master processing device can read the power change record 410 and take appropriate actions to avoid new power failures caused by the same failure triggering PoC camera, in particular by restricting it to remain in the low power mode. In this way, the troubleshooting can be easier and the system installation cost can be reduced.

The power change record 410 may take other values (other than camera IDs) as explained below, to make it possible for the master processing device to distinguish between various contexts when a power failure occurs, and thus to take appropriate actions.

Possible values for the power change record 410 include:

a camera identifier (represented in a format of 48-bit MAC address) as mentioned above;

a "null" value, meaning that the power change camera ID field 411 has been reset and that there is currently no camera in the process of switching from the low power mode to the high power mode. The "Null" value can be represented, for example, in a format of 48-bit MAC address, as a value coded by 6 Bytes (48-bit) all equal to 0xFF;

a "state restore" value which may be coded by a reserved 48-bit value (different from the "null" value). As described below, the "state restore" value may help the master processing device to detect an unstable powering configuration when trying to restore the PoC system according to FIG. 8 or 10.

Still referring to FIG. 3a, the camera status list 420 is used to store, for each of PoC cameras of PoC system considered, a current camera power status or mode. The camera status list 420 can be built upon request by the master processing device.

According to an embodiment, the camera status list 420 comprises a camera ID column 421 storing the camera identifiers of the PoC cameras in the PoC system and a power status column 422 storing the current power statuses of the cameras.

As mentioned above, when a PoC camera is indicated as currently being powered in the low power mode (which means the current power status in the camera status list 420 is "Low Power"), the PoC camera currently uses only its basic communication functions since it is powered in the low power mode. This is the by-default status of the PoC cameras when rebooted.

When a PoC camera is indicated as currently being powered in the high power mode (which means the current power status is "High Power"), the PoC camera is fully functional, which means all the functions of the camera are operable.

As described below, the camera status list 420 is used to determine, in case of power failure, if it is a power failure at the port level or at the system level. For instance, when the camera status list 420 indicates that all of the PoC cameras after reboot are in the low power mode, it usually means all of the PoC cameras have been rebooted due to a power failure at PoC system level. On the other hand, if at least one PoC camera is currently in the high power mode in the camera status list 420 built after reboot, it means that only a part of the PoC system has been actually rebooted, thereby meaning that only a power failure at port level occurred.

Since the camera status list 420 is used for punctual processing, it does not need to be persistent upon (partial or total) failure of the PoC system. It may thus be stored in RAM of the master processing device.

Figure 9:
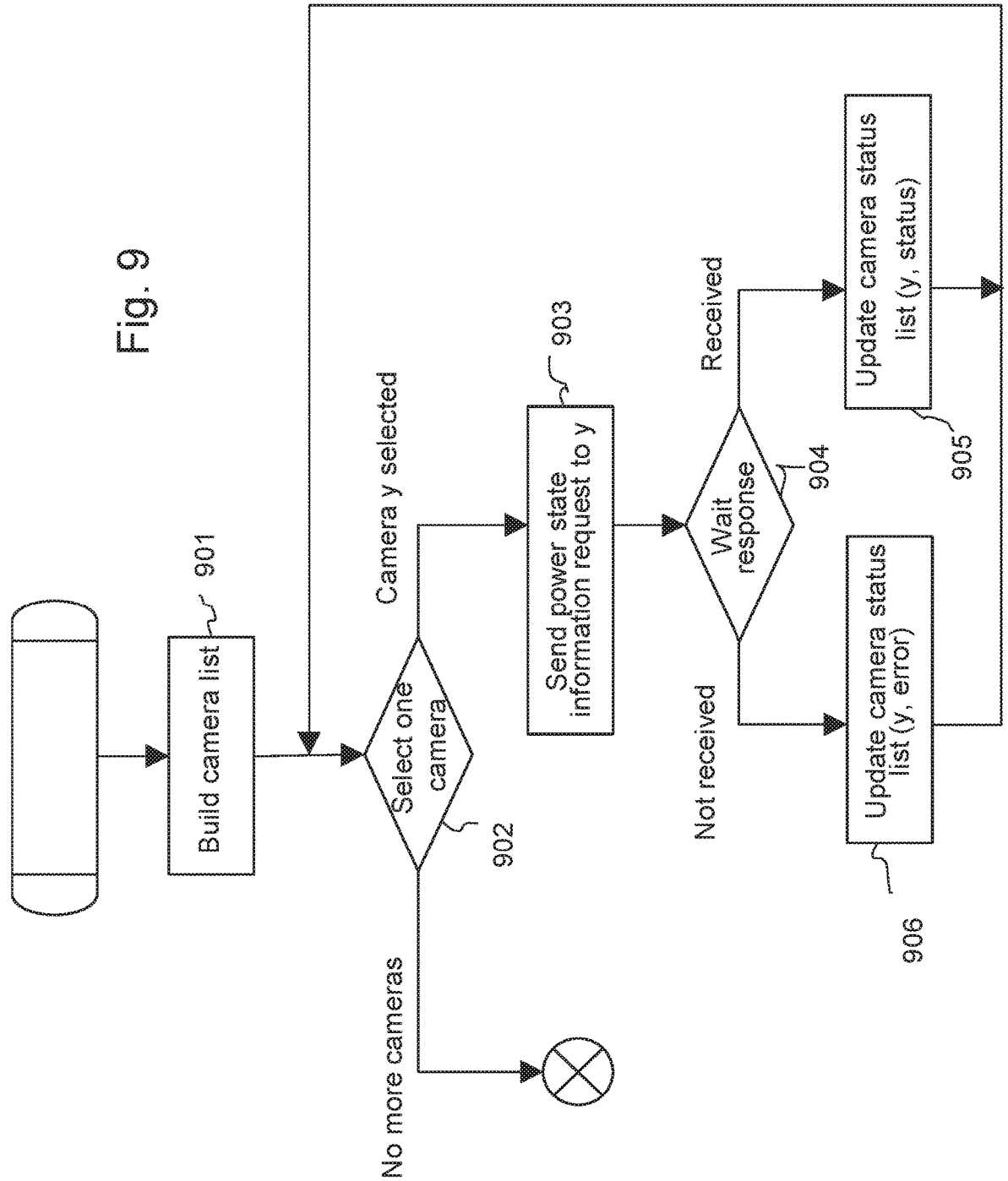
FIG. 9 illustrates, using a flowchart, steps of building a camera status list in the process of FIG. 6.

Steps of building the camera status list 420 are illustrated in FIG. 9 and in the following related paragraphs.

Figure 6:
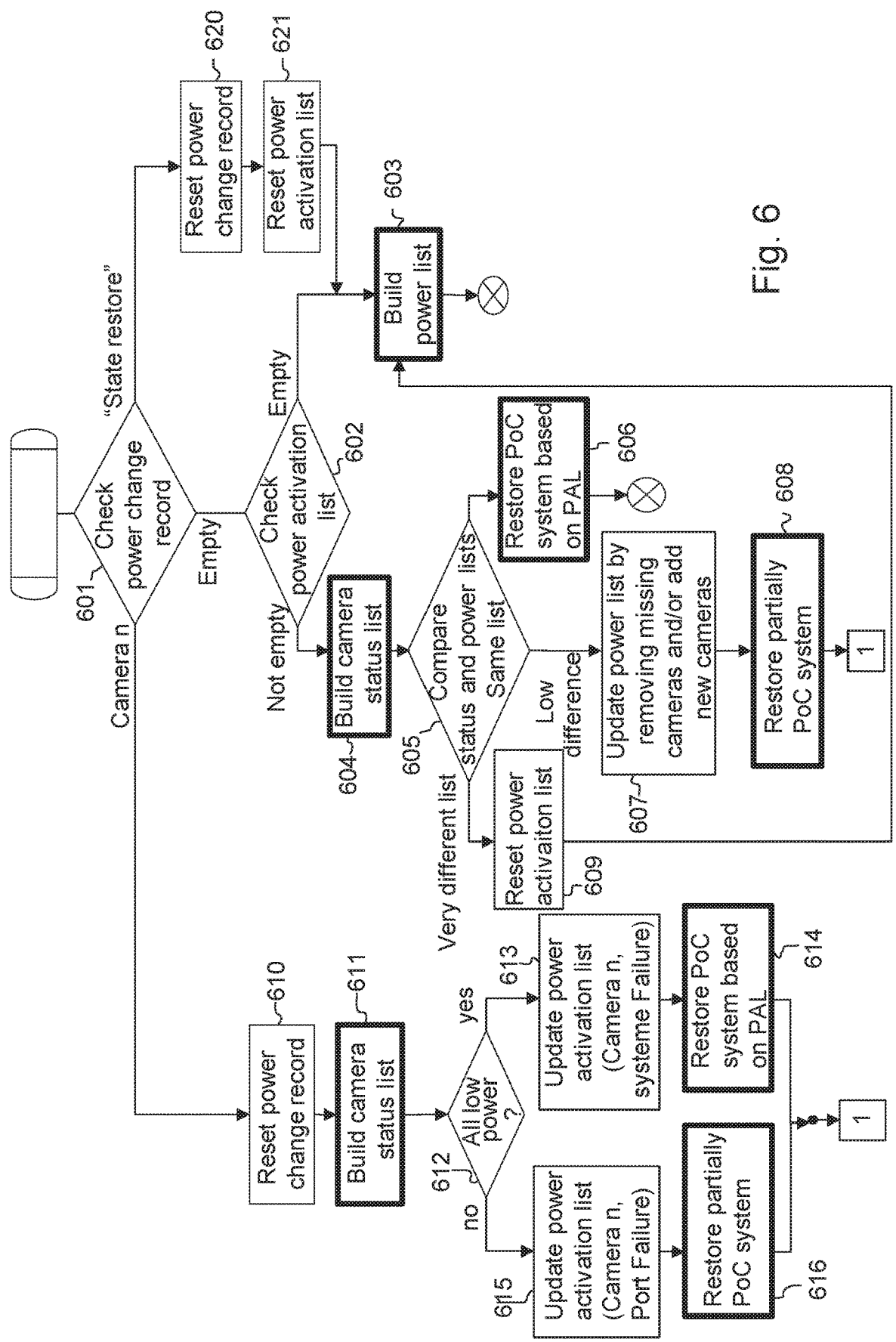
FIG. 6 illustrates, using a flowchart, main steps of a power management method according to a master/slave-based embodiment of the invention.

FIG. 6 illustrates main steps 601 to 616 of the power management method according to a master/slave-based embodiment of the invention, using the data structures of FIG. 3a.

These steps take place in the master processing device (either the PSE 103/104 or one master device selected from the PoC devices) when the master processing device starts up. Note that the start-up may be a first start-up of the PoC system, or may result from a reboot after a failure, no matter it is a power failure or a failure caused by another reason.

Step 601 consists for the master processing device of reading the power change record 410 in non-volatile memory to determine its value: either a PoC device ID, or a null (or empty) value, or a "state restore" value.

If the power change record 410 is empty (which means that the system start-up is not consecutive to a power failure resulting from a request to a PoC device to switch into the high power mode), next step is step 602 during which the current power activation list 400 is checked to determine if the power activation list 400 is empty or not.

If the power activation list 400 is empty, meaning it is a first system start-up after the PoC system 100*a*/100*b* has been installed, next step is step 603 during which a new power activation list 400 is built, i.e. during which the powering flags 402 for the PoC devices are determined in order to obtain a stable powering configuration for the PoC system.

Step 603 of building a power activation list comprises steps 701 to 711 which will be further illustrated in detail in FIG. 7. Once the power activation list 400 is built, the procedure is finished.

Otherwise if the power activation list 400 is not empty at test 602, meaning that the PoC system has been rebooted or restarted for any other reason besides a power failure (e.g. after the system having been stopped for maintenance, for power saving or for unrecoverable power cut), next steps 605-609 seek to determine whether an updating of the power activation list 400 is necessary.

In general, these steps include:

determining a list of PoC devices in the PoC system;

comparing the determined list of PoC devices with the power activation list 400, i.e. with the PoC devices having an associated powering flag.

Then, if the comparison identifies slight changes (for instance at most 1 new device and 1 removed device) or no change in the PoC devices, the power activation list 400 may be updated to have one powering flag for each PoC device of the determined list of PoC devices, and the PoC system may be restored in a powering configuration as defined by the updated power activation list 400. Exemplary processes for restoring are provided below with reference to FIGS. 8 and 10. Of course, no updating is needed in case of no change in the PoC devices.

On the other hand, if the comparison identifies substantial changes in the PoC devices, the power activation list 400 may be reset, meaning that all the powering flags are reset to a by-default value (e.g. the low power mode) and a powering flag is thus determined anew for each PoC device of the power activation list. In other words, a new power activation list 400 is built as introduced above with reference to step 603.

The PoC system and the power activation list 400 thus dynamically adapt to the addition/removal of devices.

As shown in the Figure, in step 604 a camera status list 420 is built.

FIG. 9 illustrates exemplary steps 901 to 906 for building such a camera status list 420.

The building process starts at step 901 during which the master processing device (a PSE or a master camera) builds a camera list comprising camera identifiers of all the cameras of the PoC system.

In one embodiment, such camera list is built using the standard HomePlug AV management service (CC_discover_list.request message described in section 6.5.1.2.13 of IEEE Std 1901™-2010) that provides a list of MAC addresses of the cameras participating to the HomePlug AV network.

According to another embodiment, the camera list is obtained as a result of performing a master election algorithm, thus giving a list of the MAC addresses of the slave cameras.

Next to step 901, step 902 consists of selecting successively each of the cameras listed in the camera list built during step 901.

When a camera "y" is selected, step 903 is executed during which the master processing device sends a power status information request message 521 to camera "y".

Figure 4:
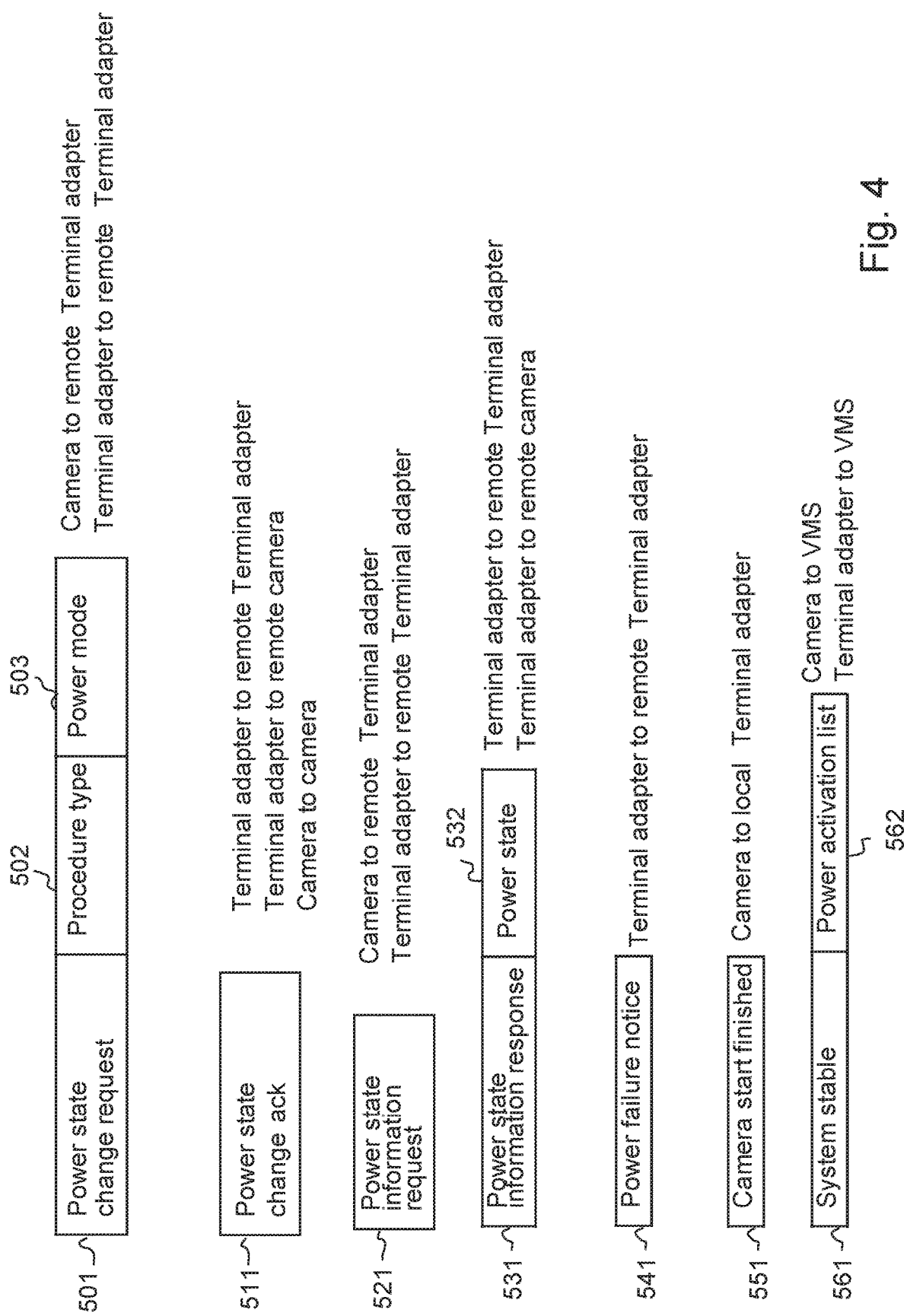
FIG. 4 illustrates different messages exchanged between cameras of a camera group set using the same power supply system.

The power status information request message 521 is illustrated in FIG. 4.

FIG. 4 illustrates different messages exchanged between cameras of a camera group set using the same power supply system. According to an embodiment, these messages are sent by using HomePlug AV messages.

For example the messages 501, 511, 521, 531 and 541 described in the Figure are sent as the HLE payload of a CM_ENCRYPTED_PAYLOAD.indication HPAV message. Such a message is illustrated in FIG. 5.

Figure 5:
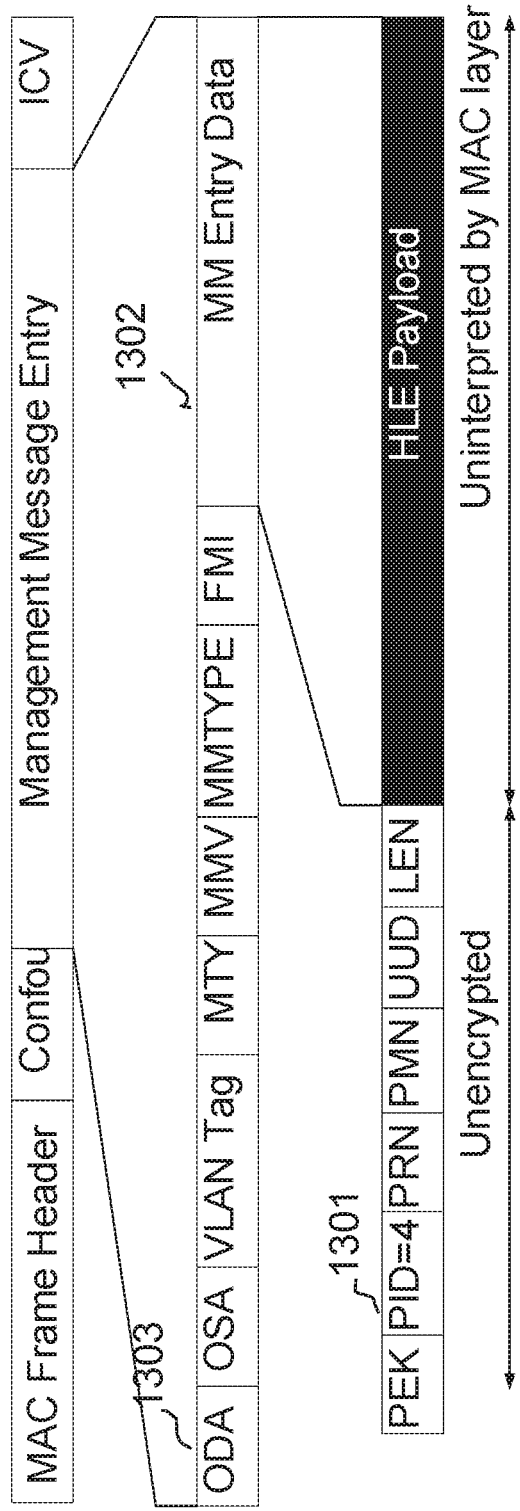
FIG. 5 illustrates the HomePlug AV management message used to transport Layer 2 HomePlug AV messages.

FIG. 5 illustrates the HomePlug AV management message used to transport Layer 2 HomePlug AV messages.

A CM_ENCRYPTED_PAYLOAD.indication HPAV message is used with a specific Protocol Identifier (PID) with a value of 0x04. In such a case, the message is not processed by the HPAV MAC layer, and an entire MM Entry Data field 1302 of the message is simply passed, without being interpreted, to and from a Higher Layer Entity (HLE).

According to different embodiments of the invention, the HLE is either the CPU 304/1402 of the terminal adapter by setting a destination address field 1303 to the Ethernet MAC address of the CPU 304/1402, or the network processor 322 of the network camera 301 by setting the destination address field 1303 to the Ethernet MAC address of the network processor 322.

The description of other fields of the messages is available in the HomePlug AV specifications that can be obtained from the HomePlug AV consortium. Moreover, in the IEEE1901 specifications, the CM_ENCRYPTED_PAYLOAD.indication message is described in section 6.5.1.5.2 (IEEE Std 1901™-2010).

Referring back to FIG. 4 illustrating the messages exchanged between the PoC cameras, it may be noted that the "Home mode" of the HomePlug AV system which is a Peer to Peer mode, makes it possible to provide communications between the cameras, regardless of they are slaves or not.

Another mode of the HomePlug AV system, namely the "Access mode", does not allow slave-to-slave communications to be done (which means no communication between any two of the slave cameras). In this configuration it is necessary that the addressee of the messages is a master node, e.g. the PSE, so that all the cameras can send their videos to the PSE.

However, where the cameras need to communicate with each other, the messages shown in the Figure can be sent as payload of a level 3 protocol message with routing. One example is to use the UDP protocol.

The power status information request 521 is only a message identified as such. It is sent by the master processing device to a slave camera. The slave camera responds to the master processing node by sending a power status information response message 531 comprising a power status field 532 in which the current power status of the slave camera is indicated. In the present example, the current power status of a PoC camera is either low power mode or high power mode.

Referring back to FIG. 9, a power status information request 521 is sent at step 903, and the master processing device waits for a response thereto at step 904. If, within a predetermined period of time, a power status information response message 531 is received from camera "y", step 905 is performed to update the camera status list 420 by setting the current power status of camera "y" to the received power status of field 532 in the received power status information response message 531.

Otherwise if no power status information response message 531 is received after the predetermined period of time (e.g. a timeout), step 906 is performed to update the camera status list 420 by setting the current power status of camera "y" to "error" in order to indicate that camera "y" is no longer responding to messages.

After step 905 or 906, the process loops back to step 902 to consider the next camera in the list built at step 901. Once all the cameras have been considered, the procedure is finished.

Referring back to FIG. 6, a camera status list 420 is thus built at step 604 using the process of FIG. 9.

Next to step 604, step 605 compares camera identifiers stored in the camera status list 420 and camera identifiers stored in the power activation list 400. If the two lists 420 and 400 comprise the same camera identifiers, it means that the PoC system has not been changed since the last (re) start-up. Thus next step 606 restores the PoC system based on the power activation list 400, meaning that each PoC camera is instructed by the master processing device to switch to the power mode as specified in the powering flags of the power activation list 400.

An exemplary implementation of the restoring is illustrated below with reference to FIG. 8. Once PoC system has been restored based on the power activation list 400, the procedure is finished.

If the two lists 420 and 400 have minimal differences (e.g. one or two camera identifiers differentiate the two lists 420 and 400), it means that the PoC system has slightly evolved since the last power-up and the power activation list 400 may need to be updated before the PoC system is partially restored. In this case, following step 607 is then executed.

At step 607, the power activation list 400 is updated by adding therein camera identifiers of newly installed cameras (whose camera identifiers are not present in the power activation list 400 but are present in the camera status list 420), and by removing therefrom camera identifiers of removed cameras (whose camera identifiers are present in the power activation list 400 but are not present in the camera status list 420).

Note that the newly installed cameras are added to the power activation list 400 with a powering flag set to the current power statuses indicated in the camera status list 420.

Next step 608 is executed to partially restore the PoC system in the powering configuration defined by the power activation list 400.

The partial restoring is quite similar to the full restoring. It comprises steps 1001 to 1006 which will be further illustrated in detail in FIG. 10. For instance, the master processing device instructs the slave cameras whose current power statuses are different from their corresponding powering flag in the power activation list 400, to switch to the power modes indicated in the powering flags. Once the PoC system has been partially restored, the procedure continues at step 703 of FIG. 7 described below (square with reference 1 in FIG. 6) to determine the powering flag for the newly installed cameras, i.e. to find the adequate power modes of the newly installed camera(s).

On the other hand, if the two lists 420 and 400 have more than the above-mentioned minimal differences, meaning that the PoC system has significantly changed since the last power-up (e.g. half of the cameras have been changed), next step is step 609 resetting the power activation list 400 after going to step 603 introduced above to build a new power activation list mirroring a stable powering configuration of the PoC system. In this way, the PoC system automatically adapts itself to the changes of its environment (e.g. changes in power supply capacity, cable failure and power drop, etc).

Referring back to step 601, if the power change record 410 stores the camera identifier of camera "n", it means that the PSE or port power failure experienced by the master processing device to start the process of FIG. 6 results from an attempt of camera "n" to switch to the high power mode. In other words, target camera "n" is a failure triggering camera in the meaning of the invention, for which a restriction to remain in the low power mode should be taken.

At step 610, the power change record is reset, meaning that it is reset before restricting failure triggering camera "n" or switching any camera to the high power mode.

Next to step 610, step 611 builds a camera status list 420 in the same way as described above for step 604, e.g. with reference to FIG. 9. It makes it possible for the master processing device to determine the current power modes of the PoC devices before restoring the PoC system.

Based on the camera status list 420, i.e. on the determined current power modes of the PoC devices, the master processing device is able to determine whether a system/PSE failure or a port failure happened. In particular, it determines that a power failure impacted the whole PSE (system failure) if the current power modes of all the PoC devices are low power modes, or it determining that a power failure impacted only a port of the PSE (port failure) when the current power mode of at least one PoC device is the high power mode.

To do so, step 612 checks the built camera status list 420 to determine whether all cameras in the camera status list 420 are in the low power mode or not.

If it is indicated that all of the PoC cameras are currently in the low power mode, meaning the last power failure caused by camera "n" was likely to be at the system level, next step is step 613 during which the power activation list 400 is updated to restrict the failure triggering camera "n" to remain in the low power mode. This includes setting the corresponding powering flag in the power activation list 400 to a restricted low power mode.

In the example of FIG. 3*a*, the powering flag is set to "System Failure". It means that, from now on, the master processing device knows that camera "n" is liable to cause new power failures at the system level if it is switched again to the high power mode. The master processing device will thus no longer request failure-triggering camera "n" to switch again to the high power mode.

Next to step 613, step 614 restores the PoC system based on the power activation list 400, which was the last known stable powering configuration of the PoC system, The restoring of step 614 is similar to the one of step 606 as described above.

Referring back to step 612, if it is indicated in the camera status list 420 that at least one of the PoC cameras is currently in the high power mode, meaning that the last power failure caused by camera "n" was at the port level, next step is step 615 during which the power activation list 400 is updated to restrict the failure triggering camera "n" to remain in the low power mode. Again, this includes setting the corresponding powering flag in the power activation list 400 to a restricted low power mode.

In the example of FIG. 3a, the powering flag is set to "Port Failure". It means that, from now on, the master processing device knows that camera "n" is liable to cause new power failures at the port level if it is switched again to the high power mode. The master processing device will thus no longer request failure triggering camera "n" to switch again to the high power mode.

Next to step 615, step 616 partially restores the PoC system based on the power activation list 400, which was the last known stable powering configuration of the PoC system. The restoring of step 616 is similar to the one of step 608 as described above.

Once the PoC system has been restored according to the power activation list 400 after step 614 or 616, the procedure continues at step 703 of FIG. 7 described below (square with reference 1 in FIG. 6) to determine the powering flag for other PoC cameras that have not yet been tested. Such not-yet-tested cameras are identified in the power activation list 400 as those cameras having a powering flag set to the by-default low power value. This is described in more details below with reference to FIG. 7.

Referring back to step 601, if the power change record 410 stores the "state restore" value, meaning that the master processing device was performing a system restoring when a failure and a reboot of the device happened, the power activation list 400 no longer mirrors a stable powering configuration of the PoC system. As a consequence, the power change record 410 may be reset at step 620 (similar to step 610), the power activation list 420 may also be reset at step 621 (similar to step 609), and a new power activation list 420 can be built by going to step 603 described above.

FIG. 7 illustrates the steps 701 to 711 of building the power activation list 400, i.e. of determining a stable powering configuration of any PoC system 100a/100b.

As mentioned above, this process may illustrate the details of step 603 of FIG. 6.

Before illustrating in detail the steps 701 to 711, an overview of the building process is provided. After having identified all the PoC cameras belonging to the PoC system, they are switched sequentially to the high power mode one by one, which makes it possible to avoid a sudden surge of power supply at start-up of the system.

At each power switching, both of the power activation list and the power change record are updated. Therefore, in case a power failure occurs, the power activation list reflects the last known stable network configuration and the power change record indicates the failure triggering camera which caused the power failure. In this way, the troubleshooting can be easier and the system installation cost can be reduced.

Generally speaking, the building process seeks to determine a powering flag for each PoC device of the PoC system. It is made by iterating the following steps on each PoC device having a powering flag set to a by-default low power mode (in a build camera status list):

storing, in the power change record, an identifier of the PoC device considered;
instructing the PoC device considered to switch to the higher power mode;
if a switching acknowledgment is received from the PoC device considered, setting the powering flag of the PoC device considered to a high power mode; otherwise, setting the powering flag of the PoC device considered to a restricted low power mode, usually "Port failure"; and
resetting the power change record after the powering flag is set.

Note that if the switching causes a system failure, the master processing node reboots and the process of FIG. 6 starts again as described above, thereby making it possible to identify the failure triggering camera through the power change record, and to take appropriate actions to restrict the failure triggering camera to remain in the low power mode.

This approach makes it possible to progressively build a list (power activation list below).

As shown in the Figure, step 701 consists of building the camera status list 420 as described above with reference to step 604 or 611, an exemplary implementation of which is illustrated in FIG. 9.

The built camera status list 420 makes it possible to create a first version of the power activation list 400. This first version includes the same cameras as in the camera status list 420 and associates a powering flag with each of the cameras with a by-default value set to low power mode. Indeed, the value "low power" is not a final status because either the cameras can be switched into the high power mode and the powering flags will be set accordingly, or they cannot be switched because of power failure, in which case their powering flags will be set to system or port failure.

Next, step 702 is performed to check the built camera status list 420 so as to determine whether or not all of the cameras of the PoC system are currently in the low power mode.

If all the cameras are currently in the low power mode, meaning that the whole PoC system has been booted, next step is step 703 to sequentially test all the cameras.

If at least one camera is currently in the high power mode at step 702, meaning that the current master processing device is a newly selected master processing device for the PoC system or meaning that the current master processing device reboots after a port failure when performing a partial restoring (in which case the list 420 is reset), step 711 is performed in order to save the workable current power statuses of the cameras in the power activation list 400.

Thus the first version of the power activation list 400 is updated by setting the powering flags as "High Power" for these cameras that are indicated by the camera status list 420 as already being in the high power mode. Next, step 703 is executed to complete the building of the power activation list, in particular to sequentially test all the cameras not yet in the high power mode.

At step 703, the master processing device selects one camera flagged as "Low Power" mode (i.e. by-default value) in the power activation list 400.

When all the cameras have been tested in the high power mode (so they are either flagged as "High Power" mode or flagged as "System Failure" or "Port Failure"), the capacities and power statuses of the cameras of the PoC system are reflected by the built power activation list. The procedure thus ends at step 712 during which the master processing device transmits the list of the powering flags, i.e. the power activation list 400, to a monitoring system external to the PoC system, for instance VMS 101 or any other monitoring tool used in the video surveillance system, so as to inform the operator, the maintainer or the installer about the power status of each of the cameras. Such transmission thus facilitates a troubleshooting process of the PoC system.

The transmission may be done using message 561 shown in FIG. 4. The message comprises a PAL field 562 to include the power activation list 400 of the cameras.

If it remains in the power activation list 400 a camera "m" being flagged as "Low Power" mode, the master processing device proceeds with steps 704 and 705 to test camera "m". The order of steps 704 and 705 has no importance, and they can be performed simultaneously.

At step 704, the master processing device sends a power status change request message 501 to camera "m".

The power change request message 501 is shown in FIG. 4 and comprises an optional procedure type field 502 and a power mode field 503. This message requests the addressee slave camera to perform a power mode change, i.e. a switch to the power mode indicated in the power mode field 503, either "High Power" or "Low Power".

The procedure type field 502 comprises "build list" value or "restore list" value, thereby indicating during which process (building of the power activation list 400 or restoring) the request is made. This is used by the addressee slave camera to adjust its process when responding to the request message, in order to speed up the response in case of restoring, contrary to the building of the power activation list 400 that requires the slave camera to provide a response only when the whole switching process has ended.

During step 704, the procedure type field 502 of the transmitted request message 501 is set to "build list" and the power mode field 503 is set to "High Power". Together with step 704, step 705 updates the power change record 410 by storing the camera identifier of tested camera "m". This is to keep track of the camera about to switch to the high power mode, in order to identify the failure triggering camera in case of power failure as explained above.

Next, step 706 determines whether a power status change ack message 511 is received from tested camera "m" during a predetermined period of time, or not. A power status change ack message 511 is illustrated in FIG. 4.

As mentioned above, such response message is sent by the slave camera in two situations:

once the slave camera has successfully switched to the requested power mode (as indicated in the power mode field 503) during a system restoring; or once the slave camera has successfully switched to the high power mode after being stabilized during the power activation list building.

The criterion for stabilization of the slave camera is that the camera has finished its boot process (for example from the Low Power mode to the High Power mode) or that various capacitors have finished unloading (for example from the High Power mode to the Low Power mode).

The power status change ack message 511 may be sent either by CPU 304 or directly by the network processor 322 of the slave camera.

If a power status change ack message 511 is received at step 706 by the master processing device, meaning that camera "m" has successfully switched to the high power mode without causing any power failure, step 707 resets the power change record 410 (i.e. empty it without containing any camera identifier) and updates the power activation list 400 by setting the powering flag for tested camera "m" from "Low Power" to "High Power". Next, the process loops back to step 703 to consider and test the next camera.

If no power status change ack message 511 has been received during the predetermined period of time (e.g. a timeout), meaning that tested camera "m" has caused a power failure at the port level when switching to the high power mode, step 709 resets the power change record 410 and updates the power activation list 400 by setting the powering flag for tested camera "m" from "Low Power" to "Port Failure".

Next, the process loops back to step 703 to consider and test the next camera.

When reset, the power change record 410 is made empty without containing any camera identifier.

Turning now to the restoring of the PoC system after start-up or reboot of the master processing device, it may take place after the PoC system has experienced a full system failure in which case a full restoration (steps 606 and 614) is performed as illustrated now with reference to FIG. 8, or after the PoC system has experienced a partial failure (port failure) in which case only a partial restoration (steps 608 and 616) is necessary as illustrated below with reference to FIG. 10.

FIG. 8 illustrates the steps 801 to 808 of restoring the full PoC system based on the power activation list 400.

The steps 801 to 808 are also performed when the system is re-started after having been stopped for maintenance, for power saving or for unrecoverable power cut.

The cameras are instructed to switch to the power modes defined by the powering flags of the power activation list 400. To do so, the master processing device is responsible to read the power activation list 400 and to send the switching instructions to each of the cameras.

Therefore, the PoC system can reboot in a stable powering configuration without having to re-perform steps 701 to 711 of building the power activation list anew.

The approach described below with reference to the Figure thus provides that the restoring comprises requesting each PoC device whose associated powering flag is set to high power, to switch into the high power mode. Then, if no switching acknowledgment is received from a PoC device in response to the request, all the powering flags in the power activation list 400 can be reset to a by-default low power, meaning that the list 400 is reset because the alleged stable powering configuration is no longer stable. A new power activation list 400 needs to be built.

As shown in the Figure, an exemplary implementation of the restoring includes step 801 which sets the power change record 410 as a "state restore" value. Indicating in the power change record that the PoC system is in a restoring state helps the master processing device to identify a no-longer stable powering configuration in case a power failure happens when trying to restore the powering configuration defined by the power activation list 400. As indicated above (see steps 620 and 621), the power activation list 400 is thus reset.

Next to step 801, step 802 selects one PoC camera flagged as "High Power" mode in the power activation list 400.

If such camera "x" exists, step 804 is performed to test camera "x". During step 804, the master processing device sends a power status change request message 501 to camera "x" to instruct it to switch to the high power mode. The procedure type field 502 of message 501 is set to "restore list", and the power mode field 503 is set to "High Power".

Next to step 804, step 805 determines whether a power status change ack message 511 is received from camera "x" during a predetermined period of time, or not.

If such a power status change ack message 511 is received, meaning that camera "x" has successfully switched to the high power mode without causing any power failure, the process loops back to step 802 to test a next camera.

Otherwise if no power status change ack message 511 is received during the predetermined period of time (e.g. a timeout), meaning that camera "x" has caused a power failure at the port level when switching to the high power mode, the power activation list 400 does no longer reflect a stable powering configuration of the PoC system. Therefore, step 806 resets the power change record 410 as well as the power activation list 400, and a new power activation list 400 needs to be built by going to step 701 of FIG. 7.

Referring back to step 802, if there is no more not-tested PoC camera flagged as "High Power" in the power activation list 400, it means that all the cameras are currently in the same power modes as those defined in the power activation list 400. The powering configuration defined by this power activation list 400 is thus the current power configuration of the PoC system.

Thus, at step 807, the master processing device waits for the last camera to finish its start-up. The waiting time spent in the step 807 is for example one minute. Next, at step 808, the power change record 410 is reset, and the procedure then ends.

FIG. 10 illustrates a partial restoring of the PoC system a power activation list. As mentioned above, this figure illustrates the details of the steps 608 and 616 of FIG. 6.

The steps 1001 to 1006 of partially restoring the power activation list are performed when the PoC system experienced a partial failure (at port level) or when the PoC system has moderately changed; for example one camera has been added to the system and/or one camera has been removed or replaced by a new one, etc. In this case, the power activation list is still useful to put the PoC system in a workable and stable powering configuration.

Therefore, the invention makes it possible that all cameras of the system that were previously operating will still operate in the same way after the system restart. In addition, if one of the newly added camera(s) cannot be operable, a corresponding feedback can be given immediately after the system reboot.

The philosophy of the partial restoring of FIG. 10 is quite similar to the one of the restoring of FIG. 8. However, to reduce the number of power change request messages 501 to be sent (and thus the time needed to restore the PoC system), the restoring may also comprise:
  determining the current power modes of the PoC devices (e.g. the camera status list 420); and
  requesting to switch into the high power mode, only the PoC devices whose associated powering flag (in the power activation list 400) is set to the high power mode and for which the determined current power mode is the low power mode.

As shown in the Figure, the partial restoration starts with step 1001 similar to step 801, setting the power change record 410 to "state restore" value.

Next, step 1002, similar to step 802, selects one PoC camera flagged as "High Power" mode in the power activation list 400.

When all the PoC cameras flagged as "High Power" have been processed, steps 1007 and 1008, similar to steps 807 and 808 respectively, are performed to reset the power change record 410 and the power activation list 400.

If a PoC camera "z" flagged as "High Power" has not yet been processed, step 1003 is performed to test camera "z".

During step 1003, the master processing device determines the current power status of camera "z" based on the camera status list 420 (built either at step 604 or at step 611).

If it is indicated in the camera status list 420 that camera "z" is currently already in the high power mode, the master processing device does not need to change it and the process loops back to step 902 to process a next camera. Thanks to test 1003, no message 501 is sent for some cameras already operating in the high power mode.

On the other hand, if camera "z" is in the "error" status, the power activation list 400 is reset at step 1006 together with the power change record 410, before a new power activation list 400 is built by going to step 701 of FIG. 7.

On yet another hand, if camera "z" is currently in the low power mode, step 1004, similar to step 804, is performed for the master processing device to send a power status change request message 501 to camera "z" to instruct it to switch to the high power mode. The procedure type field 502 of message 501 is set to "restore list", and the power mode field 503 is set to "High Power".

Next to step 1004, step 1005, similar to step 805, determines whether or not a power status change ack message 511 is received from the camera "z" during a predetermined period of time. If no ack message 511 is received, step 1006 described above is performed. Otherwise, camera "z" has actually switched to the high power mode and a new camera can be processed by looping back to step 1002.

FIGS. 6 to 10 illustrate an exemplary behaviour of the master processing device, be it the PSE 103/104 or any PoC device/camera designated as a master device/camera.

Figure 11:
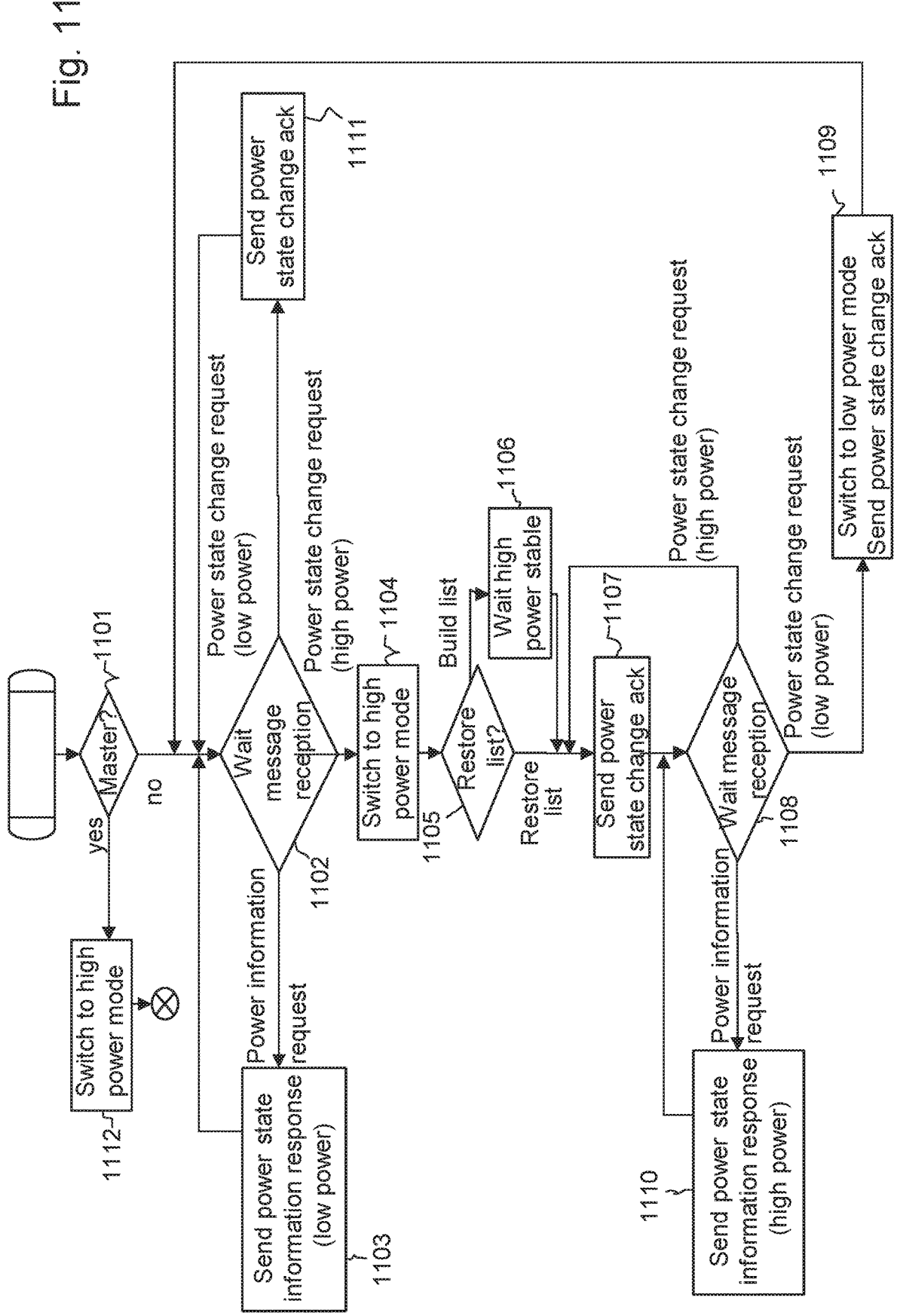
FIG. 11 illustrates, using a flowchart, main steps of each PoC device, whatever master or slave, in the process of powering itself to a power mode, according to a master/slave-based embodiment of the invention.

FIG. 11 now illustrates the main steps of each PoC device, including the slave devices, in the process of powering itself to a power mode. Steps 1101 to 1112 are executed by CPU 304 of the device.

At the start-up of the camera, it is powered, by default, in the low power mode. At this status, the network camera 301 of the camera is not started yet.

During first step 1101, a master election algorithm is executed. Any one of the cameras of the PoC system can be selected to be a master camera and the rest of cameras are thus slave cameras. As mentioned above, several existing algorithms, such as the Naxos algorithm or the Raft algorithm, are available for performing a master/slave designation among identical nodes (e.g. identical cameras).

If the result of the algorithm is to select the local camera to be a master camera, then the selected master camera executes step 1112 during which the camera switches itself to the high power mode. It may be done by sending an "ON" signal 320 by CPU 304 to the PoE PSE module 316 so that the power is delivered to the network camera 301 through line 315 according to the PoE protocol. At this point the procedure for the master camera is finished.

If the local camera is selected to be a slave camera, step 1102 is performed during which the slave camera waits for any message received from the master processing device (PSE or master camera).

A message from the master processing device is either a power status information request message 521 or a power status change request message 501 (either to switch to the high power mode or to switch to the low power mode).

If a power status information request message 521 is received from the master processing device, step 1103 sends a power status information response message 531 to the master processing device. This is to inform the master processing device of the slave camera's current power mode. These messages have been explained with reference to steps 903 and 904. During step 1103, the power status field 532 of the response message 531 is set to "Low Power" as the device is currently operating in the low power mode. Next, the process loops back to step 1102, waiting for a new message from the master processing device.

If a power status change request message 501 is received to switch to the low power mode (i.e. the power mode field 503 indicates "Low Power"), step 1111 sends a power status change ack message 511 to the master processing device because the camera is already in the requested power mode. Next, the process loops back to step 1102, waiting for a new message from the master processing device.

If a power status change request message 501 is received to switch to the high power mode (i.e. the power mode field 503 indicates "High Power"), the slave camera executes the request at step 1104, meaning that it internally instructs to switch from the low power mode to the high power mode.

For instance, an "ON" signal 320 is sent by CPU 304 to the PoE PSE module 316 so that the power is delivered to the network camera 301 through line 3115 according to the PoE protocol.

Next, the step 1105 checks the procedure type field 502 of the received power status change request message 501.

If the field value of the procedure type field 502 is "restore list", there is no need to wait for the slave camera to be stable in the high power mode and a power status change ack message 511 can be immediately sent at step 1107.

Otherwise if the field value is "build list", the slave camera needs to be sure that it is stable in the high power mode before sending an acknowledgment. Thus during step 1106 it waits the end of the start-up of the network camera 301, and then sends a power status change ack message 511 at step 1107.

During step 1106, the slave camera waits till the end of the start-up of the network camera 301. To detect the end, the network processor 322 sends an internal synchronization message 551 (as shown in FIG. 4) to the CPU 304 to inform the latter that the network camera 301 finished its boot.

Note that the internal synchronization message 551 is not necessarily sent by using the HomePlug AV messaging system. For example, it can be sent by using Ethernet level 2 protocols like SNMP or LLDP.

In this approach, the slave PoC camera receives, from the master processing device, a request to switch into the high power mode;

internally switches into the high power mode by starting powering at least one functional unit (in particular by supplying power to the network camera 301 though line 315); and waits for a boot end message (the internal synchronization message 551) from the functional unit in response to the internal switching, before acknowledging the switching to the master processing device.

In a variant to waiting for an internal synchronization message 551, the CPU 304 may simply wait for a predetermined of time which can be for instance tenths of seconds or one minute.

Next to step 1107, step 1108 (similar to step 1102) waits for receiving a new message from the master processing device. The difference with step 1102 is that the slave camera is currently in the high power mode.

Thus, if a power status information request message 521 is received from the master processing device, step 1110 similar to step 1103 is performed to send a power status information response indicated "high power" status.

If a power status change request message 501 is received to switch to the high power mode (i.e. the power mode field 503 indicates "High Power"), step 1107 is performed again to acknowledge the power mode change.

If a power status change request message 501 is received to switch to the low power mode (i.e. the power mode field 503 indicates "Low Power"), step 1109 is performed to internally switch from the high power mode to the low power mode. For instance, an "OFF" signal 320 is sent by the CPU 304 to the PoE PSE module 316 so that no more power is delivered to the network camera 301 through line 315.

Since there is no risk of power failure, a corresponding power status change ack message 511 may be sent immediately, before looping back to step 1102 (waiting state of the slave camera when it is powered in the low power mode).

The above has described exemplary embodiments based on a master/slave approach.

Embodiments based on a distributed approach are now described with reference to FIG. 12.

Figure 3B:
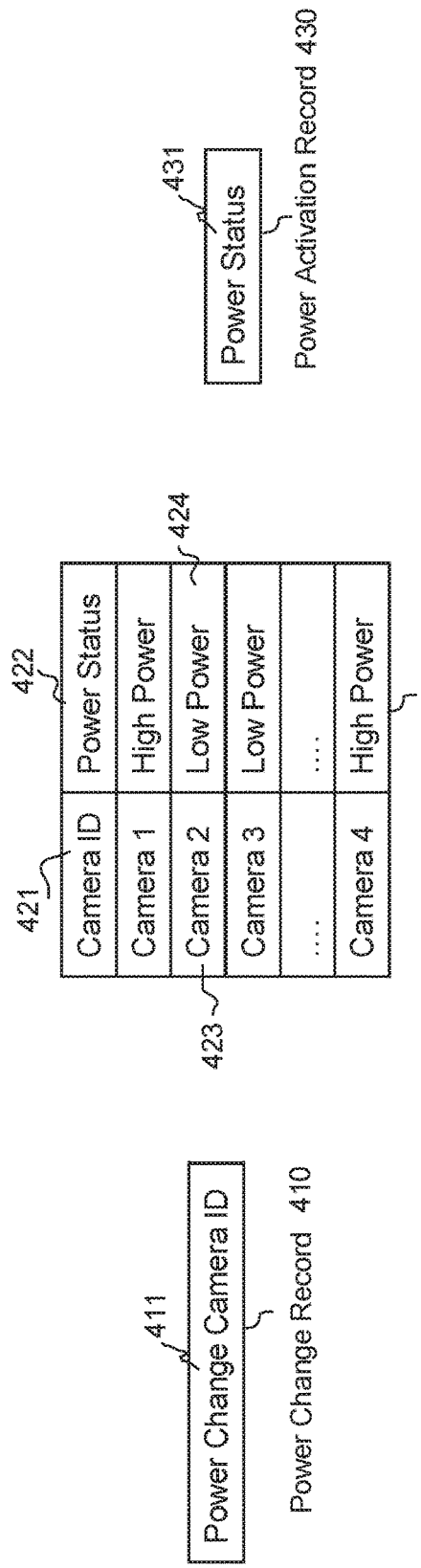
FIG. 3b illustrates various data structures used by exemplary power management methods of the invention based on a distributed approach.

FIG. 3b illustrates data structures used to perform a power management of the PoC system in a distributed approach, in particular a power change record 410, an optional camera status list 420 and a power activation record 430.

The power change record 410 and the camera status list 420 are similar to those described above for the master/slave approach. Thus the process of FIG. 9 to build the camera status list 420 can be used by any PoC camera in the distributed approach.

The power activation record 430 is stored in non-volatile memory, for instance in NVRAM. It comprises a powering flag or field 431 used to stored, for the local camera, its last known working power status. In fact, each PoC camera has its own powering flag though which it authorizes itself to switch to the high power mode or it restricts itself to remain in the low power mode.

This means that the processing device which reads the power change record 410 is the target device/camera which restricts itself to remain in the low power mode. And each of the devices powered over cable by the PSE reads a local power change record upon starting up to determine if it was about to switch from the low power mode to the high power mode before starting up and, restricts itself to remain in the low power mode in case it was about to switch or otherwise switches itself to the high power mode.

Figure 12:
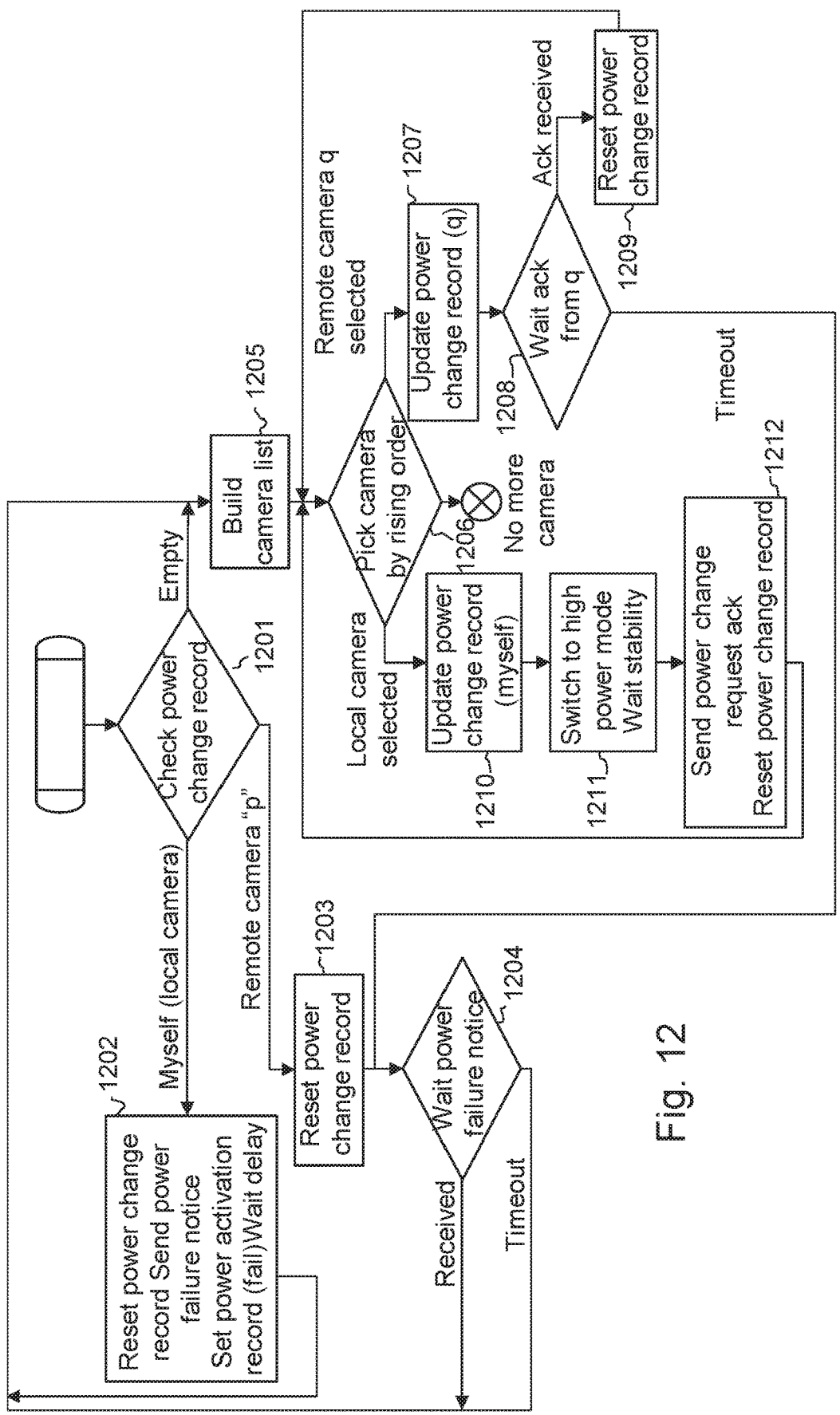
FIG. 12 illustrates, using a flowchart, main steps of a power management method according to a distributed-based embodiment of the invention.

FIG. 12 illustrates steps 1201 to 1212 executed by CPU 304 of each of the PoC cameras of the PoC system. In the distributed alternative embodiment, all cameras of the system behave in the same way represented by the algorithm executed by the CPU 304.

During step 1201, the local camera, upon booting, reads its own power change record 410 to determine its value.

If the power change record 410 is empty, meaning that the system start-up is not consecutive to a power failure and the local camera is starting as part of a normal power-on procedure, next step is step 1205 that starts a procedure of scrutinizing the behaviour of each PoC camera when switching to the high power mode, in order to obtain, at the end, a stable powering configuration of the PoC system as defined by the powering flags 431 which are stored over the cameras (instead of in a single camera in the master/slave approach described above).

Such procedure generally includes the steps of:
 determining a list of PoC devices in the PoC system;
 iterating the following steps on each PoC device of the determined list:
  setting the power change record to the PoC device under consideration;
  if the PoC device under consideration is the processing (local and target) PoC device, powering itself to the low or high power mode according to the value of a local powering flag 431 and notifying the other PoC devices of the powering;
  otherwise, waiting for a notification of the PoC device under consideration notifying its powering;

resetting the power change record after sending or receiving the notification.

As mentioned above, once all the cameras have been processed through the iterations, each camera knows (as indicated in its powering flag) if it is allowed to operate in the high power mode or not, in order to have a stable powering configuration of the whole PoC system.

At step 1205 similar to step 901, the local camera builds a camera list comprising camera identifiers of all the cameras of the current system, which can be implemented, for example, by using the standard HomePlug AV management service that provides the list of MAC addresses of all the cameras participating to the HomePlug AV network. The standard HomePlug AV list can be further refined by ruling out the cameras that do not respond to camera messages such as the power status information request message 521.

Next to step 1205, step 1206 picks up, according to a rising order for instance, a camera identifier of each of the cameras listed in the camera list. This is to sequentially consider each camera of the PoC system.

Note that all the cameras use the same order in order for them to simultaneously consider the same camera. The synchronization between the cameras is obtained through the exchange of messages as described below.

When all the cameras have been considered, the procedure finishes.

When a camera is selected, a different process is performed if the selected camera is the local camera or not.

If selected camera "q" is not the local camera, step 1207 is executed during which the local camera updates its own power change record 410 by setting it to the camera identifier of camera "q". This is to save the information that camera "q" was switching to the high power mode, in case a power failure occurs.

Next to step 1207, step 1208, similar to steps 706, 805 and 1005, determines if a power status change ack message 511 is received from camera "q" during a predetermined period of time.

If a power status change ack message 511 is received, meaning that camera "q" has successfully switched to the high power mode without causing any power failure, step 1209 resets the local power change record 410. Next, the process loops back to step 1206 to consider the next camera.

Thanks to the power status change ack message 511 received by the cameras, all of them are synchronized in the successive processing of the cameras of the list. Otherwise if no power status change ack message 511 is received during the predetermined period of time (e.g. a timeout), means that camera "q" has caused a power failure at port level when switching to the high power mode, step 1204 is executed, waiting for receiving a power failure notice message 541 from camera "q".

The power failure notice message 541 is shown in FIG. 4. Such a message is sent by camera "q" in a broadcast mode, since all the cameras need to receive it.

Referring back to step 1206, if the selected camera is the local camera, next step is step 1210 during which the local power change record 410 is set to its own camera identifier (i.e. the one of the local camera). Note that if the local camera enters step 1210, it means that the other cameras simultaneously enters step 1207 described above using the same camera identifier.

Step 1206 makes it possible for the local camera to detect it is a failure triggering camera in case of power failure. This is described below with reference to step 1202.

Thus during step 1211, the local camera powers itself to either the low power mode (i.e. remain in this mode) or the high power mode, depending on the value stored in the powering flag of the power activation record 431.

For instance, it remains in the low power mode if the powering flag is already set to "Power failure". On the other hand, it may switches itself to the high power mode if the powering flag is empty, which can be for instance implemented by sending an "ON" signal 320 by the CPU 304 to the PoE PSE module 316 to deliver the power to the network camera 301 of the local camera.

Note that a power failure may happen at this time, in which case the local camera (and other cameras) will restart the process of FIG. 12.

Next (i.e. as long as no failure occurs), step 1212 is executed to send a power status change ack message 511 to all of the cameras of the PoC system. During step 1212, the local camera also resets the local own power change record 410. Then the process loops back to step 1206 to consider the next camera in the list.

Referring back to step 1201, if, when starting-up, the local camera reads a camera identifier in the local power change record 410, a specific processing is performed in case it is its own camera identifier. Such situation takes place only when a power failure occurred when the local camera attempted to switch to the high power mode.

In this situation, step 1202 is executed during which the local camera performs the following sub-steps:

it resets the local power change record 410;

it sends a power failure notice message 541 to all the cameras of the PoC system;

it sets the powering flag of its power activation record 430 to "Power Failure" (a distinction between Port failure and System failure may also be provided by building a camera status list 420 and detecting whether or not at least one camera is in the high power mode as described above); and it waits for a predetermined period of time, for example few tenths of seconds or one minute, needed by all the cameras to receive the failure notice message 541.

Thanks to the setting of the power activation record 430, the local camera is aware that it is now restricted to remain in the low power mode at each new reboot.

On the other hand, if the power change record 410 identifies another camera "p" (different from the local camera), meaning that camera "p" caused a power failure when trying to switch to the high power mode, steps 1203 and 1204 are performed to reset the local power change record 410 and then to wait for a power failure notice message 541 from camera "p". Note that the power failure notice message 541 is sent by camera "p" when the latter enters step 1202 of its own execution of the process of FIG. 12.

No matter if the power failure notice message 541 is received from camera "p" or not after a predetermined period of time (e.g. a timeout), the process then goes on at step 1205 previously described. This is to start again the procedure of scrutinizing the behaviour of each PoC camera, simultaneously to the other cameras.

Note that thanks to the power activation records, the cameras already processed in a previous iteration of list built at step 1205 (before a power failure) will not switch to the high power mode (at step 1211 of new iteration) when considered again in a new occurrence of the procedure. As a consequence, all the cameras are progressively tested, resulting at the end in a stable powering configuration of the PoC system.

In a variant to the process of FIG. 12, each PoC device (cameras here) may not coordinate its powering with the other PoC devices. It results that a simpler implementation of the process is obtained at each PoC device, while still avoiding entering endless loops of shutdowns and reboots.

For instance, it the power change record checked at step 1201 is empty, the process may directly perform step 1210 of testing itself by setting the local power change record 410 to its own camera identifier, then powering itself to either the low power mode (i.e. remain in this mode) or the high power mode, depending on the value stored in the powering flag of the power activation record 431, and then only resetting the local power change record 410 at step 1212 before the procedure is ended.

As a consequence, the numerous loops of steps 1205 to 1209 are avoided, thereby saving processing time.

In addition, steps 1203 and 1204 are not performed since the PoC devices no longer care of the other PoC devices. Also, step 1202 does no longer send a power failure notice to the other PoC devices and no longer wait.

Whatever the master/slave approach or the distributed approach, the power management method as described above presents one or more of the following advantages:

- the power activation list 400 or the set of power activation records 430 reflect a stable powering configuration of the PoC system and allow the cameras of the PoC system to be switched sequentially to the high power mode one by one, which makes it possible to avoid a surge of power supply at start-up of part of a system (e.g. start-up of a camera subset) or of a camera system start-up;
- the power change record 410 indicates the faulty camera or operation which causes the power failure. In this way, the troubleshooting can be easier and the system installation cost can be reduced;
- The restoring mechanism (i.e. the steps 801 to 808), being performed when the PoC system is re-started after having been stopped for maintenance, for power saving or for unrecoverable power cut, makes it possible that the system can be rebooted in a stable camera powering configuration without having to re-perform the steps of building a new power activation list;
- the invention thus makes it possible to considerably reduce the risk of entering into an endless loop of shutdowns and reboots caused by a power failure.

Although the present invention has been described hereinabove with reference to specific embodiments, the present invention is not limited to the specific embodiments, and modifications which lie within the scope of the present invention will be apparent to a person skilled in the art.

Many further modifications and variations will suggest themselves to those versed in the art upon making reference to the foregoing illustrative embodiments, which are given by way of example only and which are not intended to limit the scope of the invention as determined by the appended claims. In particular different features from different embodiments may be interchanged, where appropriate.

The invention claimed is:

1. A method of managing power in a power-over-data cable system, the system comprising power source equipment and plural power over data cable (PoC) devices connected to the power source equipment, wherein the plural PoC devices are operable in a plurality of power modes comprising a low power mode and a high power mode, the method comprising the following steps performed by a processing device of the system, upon starting-up:

reading, in memory of the processing device, a power change record to determine if, prior to the start-up, a target device among the PoC devices was about to switch from the low power mode to the high power mode;

restricting the target device, if it was about to switch from the low power mode to the high power mode prior to the start-up, to remain in the low power mode;

otherwise, triggering the target device to switch to the high power mode.

2. The method of claim 1, wherein restricting the target device to remain in the low power mode includes setting a powering flag for the target device to a restricted low power mode, the powering flag being stored in a non-volatile memory of the processing device.

3. The method of claim 2, further comprising a step of determining a powering flag for each PoC device by iterating the following steps on each PoC device having a powering flag set to a by-default low power mode:

storing, in the power change record, an identifier of the PoC device considered;

instructing the PoC device considered to switch to the higher power mode;

if a switching acknowledgment is received from the PoC device considered, setting the powering flag of the PoC device considered to a high power mode; otherwise, setting the powering flag of the PoC device considered to the restricted low power mode, the powering flag being stored in a non-volatile memory of the processing device; and resetting the power change record after the powering flag is set.

4. The method of claim 3, comprising a step of restoring the PoC system in a powering configuration as defined by the powering flags associated with the PoC devices, wherein the step of restoring comprises requesting PoC devices whose associated powering flag are set to the high power mode, to switch into the high power mode.

5. The method of claim 4, wherein the step of restoring further comprises resetting all the powering flags to a by-default low power mode if no switching acknowledgment is received from a PoC device in response to the request.

6. The method of claim 4, wherein the step of restoring further comprises:

determining current power modes of the PoC devices; and requesting to switch into the high power mode, only the PoC devices whose associated powering flag is set to the high power mode and for which the determined current power mode is the low power mode.

7. The method of claim 4, further comprising, before the step of restoring, a step of indicating in the power change record that the system is in a restoring state.

8. The method of claim 4, further comprising:

determining current power modes of the PoC devices before restoring the PoC system; and based on the determined current power modes of the PoC devices determining that a power failure impacted the whole power source equipment when the current power modes of all the PoC devices are low power modes or determining that a power failure impacted only a port of the power source equipment when the current power mode of at least one PoC device is the high power mode.

9. The method of claim 3, further comprising, in case the read power change record is empty:

determining a list of PoC devices in the PoC system;

comparing the determined list of PoC devices with the PoC devices having an associated powering flag in the non-volatile memory of the processing device;

in case the comparison identifies slight changes or no change in the PoC devices, updating a list of powering flags to have one powering flag for each PoC device of the determined list of PoC devices, and restoring the PoC system in a powering configuration as defined by the updated list of powering flags, in case the comparison identifies substantial changes in the PoC devices, resetting all the powering flags and determining a powering flag for each PoC device of the determined list.

10. The method of claim 9, wherein the comparison identifies slight changes in the PoC devices if there is no more than a predefined number of PoC devices that is added into or removed from the PoC system.

11. The method of claim 3, further comprising transmitting a list of the powering flags to a monitoring system external to the PoC system.

12. The method of claim 1, wherein the processing device is one PoC device selected from the PoC devices powered by the power source equipment in the PoC system.

13. The method of claim 1, wherein the processing device is the power source equipment.

14. The method of claim 1, further comprising resetting the power change record before restricting or switching the target device.

15. The method of claim 1, further comprising the following steps, performed by one PoC device different from the processing device:
receiving, from the processing device, a request to switch into the high power mode;
internally switching into the high power mode by starting powering at least one functional unit; and
waiting for a boot end message from the functional unit in response to the internal switching, before acknowledging the switching to the processing device.

16. The method of claim 1, wherein the processing device is the target device.

17. The method of claim 16, wherein each of the devices powered over cable by the power source equipment reads a local power change record upon starting up to determine if it was about to switch from the low power mode to the high power mode before starting up, and restricts itself to remain in the low power mode in case it was about to switch or otherwise switches itself to the high power mode.

18. The method of claim 16, further comprising:
determining a list of PoC devices in the PoC system;
iterating the following steps on each PoC device of the determined list:
setting the power change record to the PoC device under consideration;
if the PoC device under consideration is the processing device, powering itself to the low or high power mode according to the value of a local powering flag and notifying the other PoC devices of the powering;
otherwise, waiting for a notification of the PoC device under consideration notifying its powering;
resetting the power change record after sending or receiving the notification.

19. A non-transitory computer-readable medium storing a program which, when executed by a microprocessor, causes a method of managing power in a power-over-data cable system, the system comprising power source equipment and plural power over data cable (PoC) devices connected to the power source equipment, wherein the plural PoC devices are operable in a plurality of power modes comprising a low power mode and a high power mode, the method comprising the following steps performed by a processing device of the system, upon starting-up:
reading, in memory of the processing device, a power change record to determine if, prior to the start-up, a target device among the PoC devices was about to switch from the low power mode to the high power mode;
restricting the target device, if it was about to switch from the low power mode to the high power mode prior to the start-up, to remain in the low power mode;
otherwise, triggering the target device to switch to the high power mode.

20. A power-over-data cable system, the system comprising power source equipment and plural power over data cable (PoC) devices connected to the power source equipment, wherein the plural PoC devices are operable in a plurality of power modes comprising a low power mode and a high power mode, the system comprising at least one microprocessor configured for carrying out the steps of:
reading, in memory of the processing device, a power change record to determine if, prior to the start-up, a target device among the PoC devices was about to switch from the low power mode to the high power mode;
restricting the target device, if it was about to switch from the low power mode to the high power mode prior to the start-up, to remain in the low power mode;
otherwise, triggering the target device to switch to the high power mode.

\* \* \* \* \*